(12) United States Patent
Shinoda

(10) Patent No.: US 10,289,227 B2
(45) Date of Patent: May 14, 2019

(54) METHOD FOR MANUFACTURING TOUCH SENSING DEVICE AND TOUCH SENSING DEVICE

(71) Applicant: HOSIDEN CORPORATION, Yao-shi, Osaka (JP)

(72) Inventor: Koji Shinoda, Yao (JP)

(73) Assignee: HOSIDEN CORPORATION, Yao-Shi, Osaka (JP)

( * ) Notice: Subject to any disclaimer, the term of this patent is extended or adjusted under 35 U.S.C. 154(b) by 0 days.

(21) Appl. No.: 15/702,151

(22) Filed: Sep. 12, 2017

(65) Prior Publication Data

US 2018/0088714 A1    Mar. 29, 2018

(30) Foreign Application Priority Data

Sep. 27, 2016   (JP) .................................. 2016-187920

(51) Int. Cl.
*G06F 3/041* (2006.01)
*B32B 38/18* (2006.01)
(Continued)

(52) U.S. Cl.
CPC ........ *G06F 3/0412* (2013.01); *B32B 38/1841* (2013.01); *G06F 3/041* (2013.01);
(Continued)

(58) Field of Classification Search
CPC .................. G06F 3/0412; G06F 3/041; G06F 2203/04103; G06F 2203/04112;
(Continued)

(56) References Cited

U.S. PATENT DOCUMENTS 8,480,832 B2 *   7/2013   Kumagai ............ B32B 38/1808
                                                    156/163
2010/0321779 A1 * 12/2010 Hane ........................ C08J 7/065
                                                    359/487.02
(Continued)

FOREIGN PATENT DOCUMENTS

JP          2006056117 A       3/2006

OTHER PUBLICATIONS

Extended European Search Report for Application No. EP 17020398.8, published by the European Patent Office (EPO), dated Jan. 31, 2018, including corresponding Communication, 1-page Annex, Information on Search Strategy, and 4-page EPO Form 1703.

*Primary Examiner* — Tom V Sheng
(74) *Attorney, Agent, or Firm* — Kilyk & Bowersox, P.L.L.C.

(57) ABSTRACT

A method for manufacturing a touch sensing device including at least 1) to 5) as follows: 1) preparing a material film being biaxially stretched and including an available area that is a partial area in a widthwise direction of the material film, the available area extending in a lengthwise direction of the material film and including first and second segments, the first and second segments defining different areas in the lengthwise direction; 2) forming an electrode group on one of the first and second segments; 3) cutting a first piece out of the material film to make the first piece including the first segment; 4) cutting a second piece out of the material film to make the second piece including the second segment; and 5) bonding the first segment to the second segment, substantially maintaining orientations of the first segment and the second segment as before the cutting.

16 Claims, 13 Drawing Sheets

(51) Int. Cl.
*B32B 37/12* (2006.01)
*B32B 38/00* (2006.01)

(52) U.S. Cl.
CPC ........... *B32B 37/12* (2013.01); *B32B 38/0004* (2013.01); *B32B 2457/208* (2013.01); *G06F 2203/04103* (2013.01); *G06F 2203/04112* (2013.01)

(58) Field of Classification Search
CPC . B32B 38/1841; B32B 38/0004; B32B 37/12; B32B 2457/208
See application file for complete search history.

(56) References Cited

U.S. PATENT DOCUMENTS

| | | | |
|---|---|---|---|
| 2015/0236242 A1* | 8/2015 | Ryu | H01L 41/125 310/313 C |
| 2015/0301659 A1* | 10/2015 | Umemoto | G06F 3/044 345/174 |
| 2016/0062509 A1* | 3/2016 | Toyoshima | G02F 1/13338 345/174 |
| 2016/0070382 A1* | 3/2016 | Toyoshima | G06F 3/044 349/12 |
| 2016/0092005 A1* | 3/2016 | Toyoshima | H01L 27/323 345/174 |

* cited by examiner

METHOD FOR MANUFACTURING TOUCH SENSING DEVICE AND TOUCH SENSING DEVICE

CROSS-REFERENCE TO RELATED APPLICATION

The present application claims priority under 35 U.S.C. § 119 of Japanese Patent Application No. 2016-187920 filed on Sep. 27, 2016, the disclosure of which is expressly incorporated by reference herein in its entirety.

BACKGROUND OF THE INVENTION

Technical Field

The invention relates to a method for manufacturing a touch sensing device and to a touch sensing device.

Background Art

In the manufacture of a touch sensing device including an optical film laminate, a touch-panel maker normally obtains a material film for producing optical film laminates in the following way. First, a PET-film maker forms and then biaxially stretches a PET (polyethylene terephthalate) film having a width of several meters using an extrusion machine, divides the PET film into a plurality of parts in a widthwise direction (transverse direction, TD), and ships the divided PET films to an ITO-film maker. Next, an ITO-film maker forms an ITO film on a face of each divided PET film, and further divides each divided PET film into a plurality of parts in a widthwise direction. Each divided PET film with an ITO film is shipped to a touch-panel maker and serves as a material film for an optical film laminate.

A touch-panel maker uses such material film to form a plurality of electrode groups on a face of the material film, and cuts the film into a plurality of portions, each with an electrode group forming a substrate. Then, a touch-panel maker bonds two substrates together to make an optical film laminate for a touch sensing device.

It is preferable that the two substrates have respective fast axes that are substantially parallel to each other, for the purpose of e.g. improving visibility of visual information when seen through a polarizing plate such as polarizing sunglasses. However, it is difficult under conventional manufacturing methods to mass-produce optical film laminates each including two substrates having fast axes that are substantially parallel to each other. Particularly, as material films for producing optical film laminates are obtained by dividing a biaxially-stretched PET film into a plurality of parts in the widthwise direction, their fast axes extend at totally different directions from one material film to another. Accordingly, if two substrates are obtained from different material films, their respective fast axes extend in significantly different directions from each other. Therefore, it is extremely difficult to bond two substrates such that their respective fast axes are substantially parallel to each other, without previously determining the fast axes.

JP 2006-56117 A discloses another conventional method for manufacturing a touch sensing device. This method addresses a problem of reducing curling of an optical film laminate when heated, by cutting two adjacent areas in the widthwise direction out of a biaxially-stretched material film to make two substrates and bonding the substrates in symmetric arrangement. As a result, the two substrates have substantially the same thickness, and the difference of the optical axis orientation between the two substrates is within a range of 20° or smaller.

SUMMARY OF INVENTION

However, since the two substrates are adjacent but different areas in the widthwise direction of the material film that are bonded together in symmetric arrangement. The optical axis orientations of such substrates are substantially misaligned from each other.

Under the above-described circumstances, the invention provides a method for manufacturing a touch sensing device suitable for mass production including two bonded substrates with reduced misalignment between the fast axis orientations of the two substrates. The invention also provides such a touch sensing device.

A method for manufacturing a touch sensing device according to an aspect of the invention includes at least 1) to 5) as follows: 1) preparing a material film, the material film being biaxially stretched and including an available area that is a partial area in a widthwise direction of the material film, the available area extending in a lengthwise direction of the material film and including a first segment and a second segment, the first and second segments defining different areas in the lengthwise direction; 2) forming an electrode group on one of the first segment and the second segment; 3) cutting a first piece out of the material film to make the first piece including the first segment; 4) cutting a second piece out of the material film to make the second piece including the second segment; and 5) bonding the first segment of the first piece to the second segment of the second piece, substantially maintaining orientations of the first segment and the second segment as before the cutting.

The manufacturing method according to this aspect provides the following first and second technical effects. Firstly, it is possible to reduce misalignment of the fast axes of the two bonded substrates. The inventors learned that in a biaxially-stretched material film having an available area that is an area in the widthwise direction of the material film if first segments and second segments are taken from anywhere in the lengthwise direction in the available area, the first and second segments have fast axes that extend substantially in the same direction. Accordingly, by bonding a first segment and a second segment in the same available area to use them as two substrates of an optical film laminate, the misalignment of the fast axes between the two substrates is minimized. Secondly, the touch sensing device is suitable for mass production. As described above, the first segment and the second segment of the touch sensing device are simply bonded together, substantially maintaining the orientations of the first and second segments. Therefore, there is no need to measure or otherwise determine the orientations of the fast axes of the first and second segments.

The material film may include a plurality of available areas being different areas in the widthwise direction of the material film. The available areas may each have a first segment and a second segment. In this case, the manufacturing method may include 2-1), 3-1), 4-1), 5-1), and 6-1) as follows. 2-1) The formation of the electrode group may include forming the electrode group on one of the first segment and the second segment in each of the available areas. 3-1) The making of the first piece may include cutting the first piece out of the material film to make the first piece extending over the plurality of available areas and including a plurality of the first segments. 4-1) The making of the second piece may include cutting the second piece out of the material film to make the second piece extending over the plurality of available areas and including a plurality of the second segments. 5-1) The bonding of the first segment to the second segment may include bonding the first segments to the respective second segments, substantially maintaining orientations of the first segments in the plurality of available areas and the second segments in the plurality of available areas as before the cutting, wherein the first segment and the second segment of each bonded set are positioned in the same one of the available areas. 6-1) The method may further include cutting sections out of the bonded first and second pieces such that the sections form respective optical film laminates each including one bonded set of the first segment and the second segment.

The manufacturing method according to the foregoing aspect is further suitable for mass production of touch sensing devices. Particularly, the method allows bulk production of optical film laminates each including a bonded set of a first segment and a second segment, by bonding the first segments in the plurality of available areas to the second segments in the plurality of available areas and cutting sections out of the bonded first and second pieces such that the sections form respective optical film laminates. Such optical film laminates are suitable for mass production of the touch sensing devices.

Alternatively, the available area may include a plurality of first segments aligned in a row in the lengthwise direction and a plurality of second segments aligned in a row in the lengthwise direction. In this case, the manufacturing method may include 2-2), 3-2), 4-2), 5-2), and 6-2) as follows. 2-2) The formation of the electrode group may include forming the electrode group on each of the first segments or on each of the second segments. 3-2) The making of the first piece may include cutting the first piece out of the material film to make the first piece including the first segments. 4-2) The making of the second piece includes cutting the second piece out of the material film to make the second piece including the second segments. 5-2) The bonding of the first piece to the second piece may include bonding the first segments of the first piece to the respective second segments of the second piece substantially maintaining orientations of the first segments and the second segments as before the cutting. 6-2) The method may further include cutting sections out of the bonded first and second pieces such that the sections form respective optical film laminates each including one bonded set of the first segment and the second segment.

The manufacturing method according to the foregoing aspect is further suitable for mass production of touch sensing devices. Particularly, the method allows bulk production of optical film laminates each including a bonded set of a first segment and a second segment, by bonding the first segments to the second segments and cutting sections out of the bonded first and second pieces such that the sections form respective optical film laminates. Such optical film laminates are suitable for mass production of the touch sensing devices.

Each of the available areas may include a plurality of first segments aligned in a row in the lengthwise direction and a plurality of second segments aligned in a row in the lengthwise direction. In this case, the manufacturing method may include 2-2-1), 3-2-1), 4-2-1), 5-2-1), and 6-2-1) as follows. 2-2-1) The formation of the electrode group may include forming the electrode group on each of the first segments in each of the available areas or on each of the second segments in each of the available areas. 3-2-1) The making of the first piece may include cutting the first piece out of the material film to make the first piece extending over the plurality of available areas and including a plurality of the first segments arranged in the plurality of available areas. 4-2-1) The making of the second piece may include cutting the second piece out of the material film to make the second piece extending over the plurality of available areas and including a plurality of the second segments arranged in the plurality of available areas. 5-2-1) The bonding of the first piece to the second piece may include bonding the first segments of the first piece to the respective second segments of the second piece, substantially maintaining the orientations of the first segments and the second segments as before the cutting, wherein the first segment and the second segment of each bonded set are positioned in the same one of the available areas. 6-2-1) The formation of the optical film laminates may include cutting sections out of the bonded first and second pieces such that the sections form the optical film laminates each including one bonded set of the first segment and the second segment.

The manufacturing method according to the foregoing aspect is more suitable for mass production of touch sensing devices. Particularly, the method allows bulk production of optical film laminates each including a bonded set of a first segment and a second segment, by bonding the first segments in the plurality of available areas to the second segments in the plurality of available areas and cutting sections out of the bonded first and second pieces such that the sections form respective optical film laminates. Such optical film laminates are suitable for mass production of the touch sensing devices.

The available area of the material film may further include a third segment being a different area in the lengthwise direction from the first and second segments. In this case, the formation of the electrode group may include forming the electrode group on the first segment of the available area. The manufacturing method may further include forming an electrode group on the third segment; cutting a third piece out of the material film to make the third piece including the third segment; and after the bonding of the first segment to the second segment, bonding the second segment of the second piece to the third segment of the third piece, substantially maintaining orientations of the first segment, the second segment, and third segment as before the cutting. Alternatively, the manufacturing method may further include forming an electrode group on the third segment; and after the bonding of the first segment to the second segment, bonding the second segment of the second piece to the third segment in the material film, substantially maintaining orientations of the first segment and the second segment as before the cutting.

A method for manufacturing a touch sensing device according to another aspect of the invention includes at least the following steps 1) to 5). 1) Preparing the material film; 2) forming an electrode group on one of the first segment and the second segment; 3) cutting a first piece out of the material film to make the first piece including the first segment; 4) subsequently bonding the first segment of the first piece to the second segment in the material film to make a bonded structure of the first piece and the material film, substantially maintaining an orientation of the first segment as before the cutting; and 5) cutting a section out of the bonded structure such that the section forms an optical film laminate including a bonded set of the first segment and the second segment.

The manufacturing method according to the foregoing aspect provides similar effects to the first and second effects described above. Further, since there is no need to make the second piece, the manufacturing process is simplified. Therefore, the method is further suitable for mass-production.

The material film may include a plurality of available areas being different areas in the widthwise direction of the material film. The available areas may each have a first segment and a second segment. In this case, the manufacturing method may include 2-1) 3-1), 4-1), and 5-1) as follows. 2-1) The formation of the electrode group may include forming the electrode group on one of the first segment and the second segment in each of the available areas. 3-1) The making of the first piece includes cutting the first piece out of the material film to make the first piece extending over the plurality of available areas and including a plurality of the first segments. 4-1) The bonding of the first segment to the material film may include bonding the first segments of the first piece to the respective second segments in the material film to make the bonded structure of the first piece and the material film, substantially maintaining orientations of the first segments in the plurality of available areas as before the cutting, wherein the first segment and the second segment of each bonded set are positioned in the same one of the available areas. 5-1) The formation of the optical film laminate may include cutting a plurality of sections out of the bonded structure such that the sections form respective optical film laminates each including one bonded set of the first segment and the second segment.

The manufacturing method according to the foregoing aspect is further suitable for mass production of touch sensing devices. Particularly, the method allows bulk production of optical film laminates each including a bonded set of a first segment and a second segment, by bonding the first segments in the plurality of available areas to the second segments in the plurality of available areas and cutting sections out of the bonded structure of the first piece and the material film such that the sections form respective optical film laminates. Such optical film laminates are suitable for mass production of the touch sensing devices.

Alternatively, the available area may include a plurality of the first segments aligned in a row in the lengthwise direction and a plurality of the second segments aligned in a row in the lengthwise direction. In this case, the manufacturing method may include 2-2), 3-2), 4-2), and 5-2) as follows. 2-2) The formation of the electrode group may include forming the electrode group on each of the first segments or one each of the second segments. 3-2) The making of the first piece may include cutting the first piece out of the material film to make the first piece including a plurality of the first segments. 4-2) The bonding of the first segment to the material film may include bonding the first segments of the first piece to the respective second segments in the material film to make the bonded structure of the first piece and the material film, substantially maintaining orientations of the first segments as before the cutting. 5-2) The formation of the optical film laminate may include cutting a plurality of sections out of the bonded structure such that the sections form respective optical film laminates each including one bonded set of the first segment and the second segment.

The manufacturing method according to the foregoing aspect is further suitable for mass production of touch sensing devices. Particularly, the method allows bulk production of optical film laminates each including a bonded set of a first segment and a second segment, by bonding the first segments to the second segments and cutting sections out of the bonded structure of the first piece and the material film such that the sections form respective optical film laminates. Such optical film laminates are suitable for mass production of the touch sensing devices.

Each of the available areas may include a plurality of first segments aligned in a row in the lengthwise direction and a plurality of second segments aligned in a row in the lengthwise direction. In this case, the manufacturing method may include 2-2-1), 3-2-1), 4-2-1), and 5-2-1) as follows. 2-2-1) The formation of the electrode group may include forming the electrode group on each of the first segments in each of the available areas or on each of the second segments in each of the available areas. 3-2-1) The making of the first piece may include cutting the first piece out of the material film to make the first piece extending over the plurality of available areas and including the plurality of first segments arranged in the plurality of available areas. 4-2-1) The bonding of the first segments to the material film may include bonding the first segments of the first piece to the respective second segments in the material film to make the bonded structure of the first piece and the material film, substantially maintaining orientations of the first segments in the plurality of available areas of the first piece as before the cutting, wherein the first segment and the second segment of each bonded set are positioned in the same one of the available areas. 5-2-1) The formation of the optical film laminates may include cutting a plurality of sections out of the bonded structure such that the sections form respective optical film laminates each including one bonded set of the first segment and the second segment.

The manufacturing method according to the foregoing aspect is more suitable for mass production of touch sensing devices. Particularly, the method allows bulk production of optical film laminates each including a bonded set of a first segment and a second segment, by bonding the first segments in the plurality of available areas to the second segments in the plurality of available areas and cutting sections out of the bonded structure of the first piece and the material film such that the sections form respective optical film laminates. Such optical film laminates are suitable for mass production of the touch sensing devices.

The available area of the material film may further include a third segment being a different area in the lengthwise direction from the first and second segments. In this case, the formation of the electrode group may include forming the electrode group on the first segment of the available area. The manufacturing method may further include forming an electrode group on the third segment; after the bonding of the first segment to the second segment, cutting a second piece out of the material film to make the second piece including the second segment; and bonding the second segment of the second piece to the third segment in the material film, substantially maintaining orientations of the first segment and the second segment as before the cutting.

The first and second manufacturing methods according to any of the aspects described above may further include forming an electrode group on the first segment and forming another electrode group on the second segment.

A touch sensing device according to one aspect of the invention includes a first substrate, a second substrate, a plurality of first electrodes, and an adhesive layer. The first substrate may be formed of the first segment of the available area of the material film. The second substrate may be formed of the second segment of the available area of the material film. The first electrodes may be formed on one of the first substrate and the second substrate. The adhesive layer may bond the first substrate and the second substrate such that the fast axes of the first and second substrates are substantially parallel to each other.

The touch sensing device according to the foregoing aspect provides at least the following first and second technical effects. Firstly, the two substrates of the touch sensing device have fast axes with a reduced misalignment between them. This is because the two substrates are formed by bonding the first and second segments in the same available area. Secondly, the touch sensing device is suitable for mass production for the following reason. There is little misalignment between the fast axes of the first and second segments. Accordingly, there is no need to measure or otherwise determine the orientations of the fast axes of the first and second segments.

The touch sensing device may further include a plurality of second electrodes. The second electrodes may be formed on the other of the first substrate and the second substrate. The first electrodes may cross the second electrodes.

The touch sensing device may further include a third substrate, a plurality of second electrodes, a first adhesive layer, and a second adhesive layer. The third substrate may be formed of a third segment of the available area. The first, second, and third segments may be different areas in the lengthwise direction of the available area. The second electrodes may be formed on the third substrate and cross the first electrodes. The first adhesive layer may bond the first substrate and the second substrate such that respective fast axes of the first and second substrates are substantially parallel to each other. The second adhesive layer may bond the second substrate and the third substrate such that the fast axes of the second and third substrates are substantially parallel to each other.

The touch sensing device according to the foregoing aspect provides at least the following first and second technical effects. Firstly, the three substrates of the touch sensing device have fast axes with a reduced misalignment between them. This is because the three substrates are formed by bonding the first, second, and third segments in the same available area. Secondly, the touch sensing device is suitable for mass production for the following reason. There is little misalignment between the fast axes of the first, second, and third segments. Accordingly, there is no need to measure or otherwise determine the orientations of the fast axes of the first, second, and third segments.

BRIEF DESCRIPTION OF DRAWINGS

The present invention can be even more fully understood with the reference to the accompanying drawings which are intended to illustrate, not limit, the present invention.

DESCRIPTION OF EMBODIMENTS

Figure 1A:
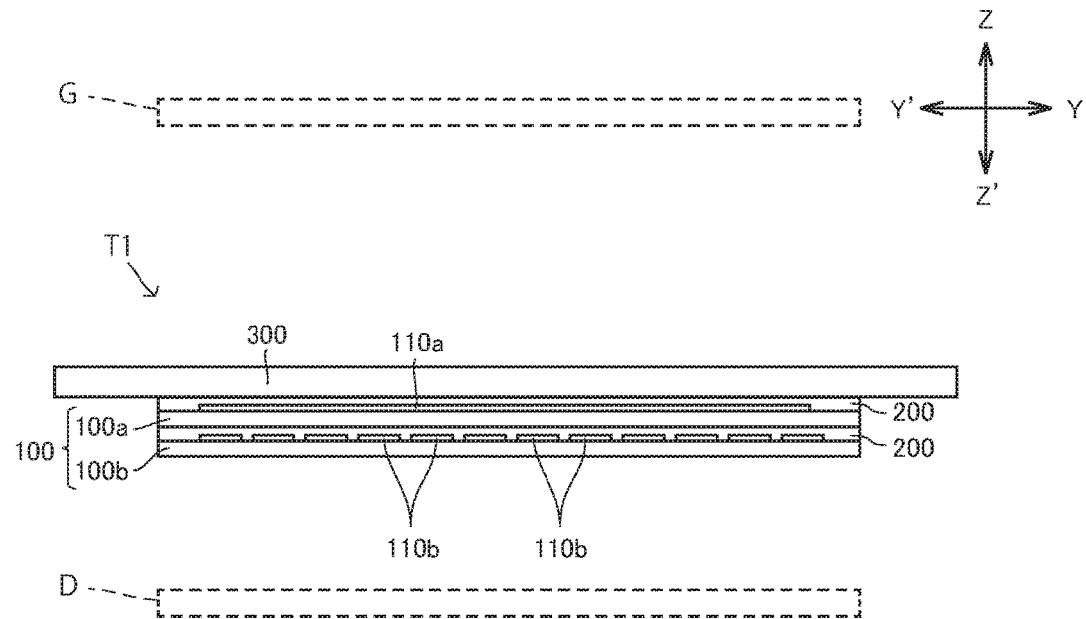
FIG. 1A is a schematic cross-sectional view of a touch sensing device according to a first embodiment of the invention, showing a positional relationship between the touch sensing device, an image display device, and a polarizing plate.
Figure 1B:
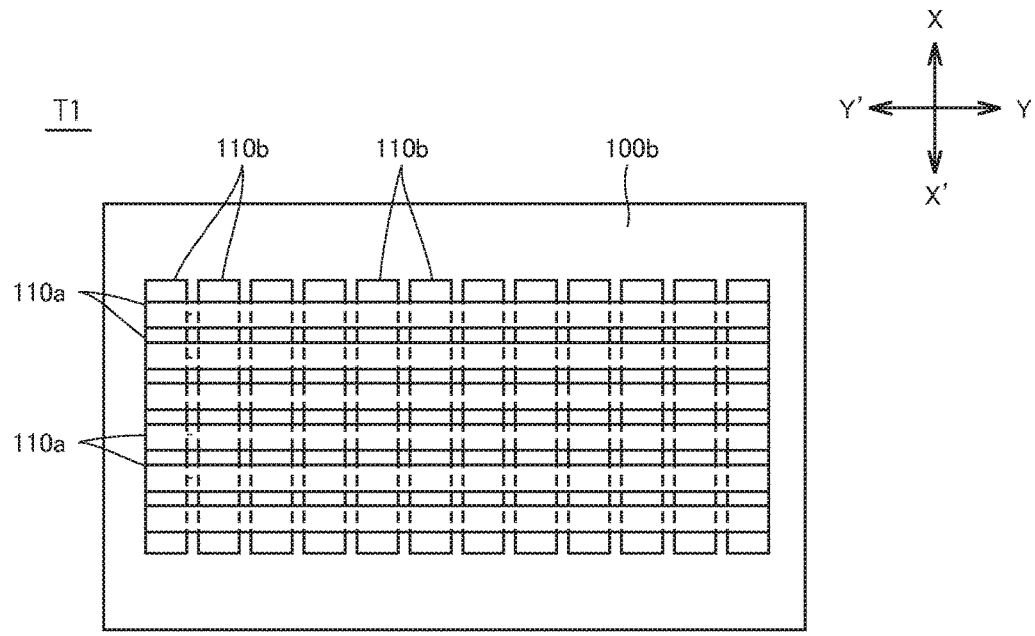
FIG. 1B is a schematic plan view of the touch sensing device.
Figure 2:
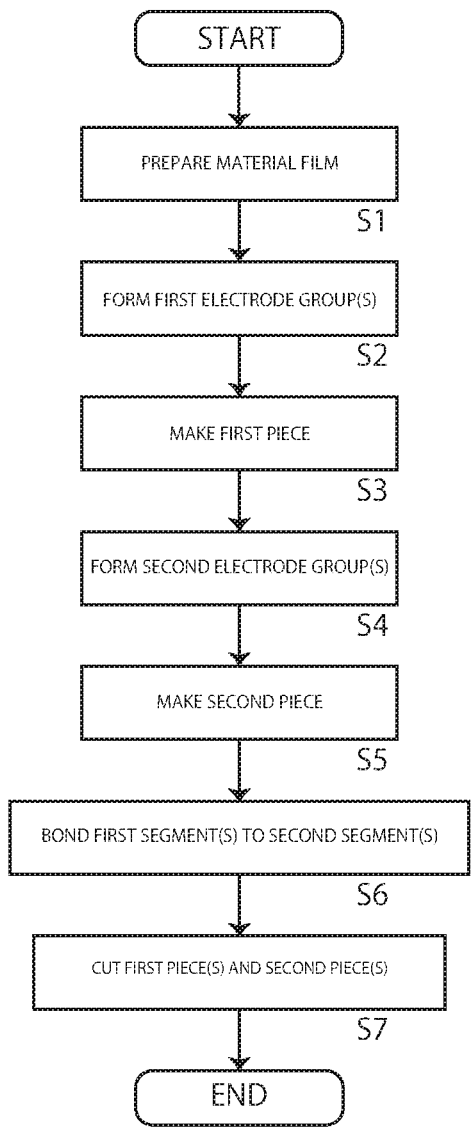
FIG. 2 is a flowchart of a first method for manufacturing the input touch device.

Some embodiments of the invention will be hereinafter described.
First Embodiment The following describes a touch sensing device T1 according to various embodiments including the first embodiment of the invention with reference to FIGS. 1A and 1B. FIGS. 1A and 1B show the touch sensing device T1 according to the first embodiment.

The touch sensing device T1 can be placed on a front side (light emission direction side) relative to an image display device D. The touch sensing device T1 can be placed between a polarizing plate G, such as sunglasses, and an image display device D. A viewer can recognize visual information (letters and text) displayed by the image display device D through the polarizing plate G and the touch sensing device T1, or through only the touch sensing device T1 without the polarizing plate G. The touch sensing device T1 may preferably have a retardation value in a range between 2000 to 8000 nm, but not limited thereto. It is noted that the Z-Z' direction shown in FIG. 1A corresponds to the thickness direction of the touch sensing device T1. The Z direction corresponds to the direction in which the image display device D emit light (the light-emission direction of the image display device D), and the Z' direction corresponds to the direction opposite to the light-emission direction. The Y-Y' direction shown in FIGS. 1A and 1B corresponds to the lengthwise direction of the touch sensing device T1. The Y-Y' direction is orthogonal to the Z-Z' direction. The X-X' direction shown in FIG. 1B corresponds to the widthwise direction of the touch sensing device T1. The X-X' direction is orthogonal to Z-Z' and Y-Y' directions the Z-Z' and Y-Y' directions.

Some examples of the image display device D are liquid crystal displays (LCDs), plasma displays (PDPs), organic electroluminescent displays (OLEDs), digital light processing (DLP) projectors. The image display device D may include a white LED as a backlighting source, but not limited thereto.

The touch sensing device T1 includes a plurality of substrates 100 and at least one adhesive layer 200. The substrates 100 are stacked in the Z-Z' direction and have enough optical transparency to allow a viewer to visually recognize visual information displayed by the image display device D through the substrates 100. The substrates 100 may be partially or entirely transparent.

At least one adhesive layer 200 may be any layer that can bond two substrates 100 adjacent to each other in the Z-Z' direction. For example, the adhesive layer 200 may be an adhesive agent, an optically clear adhesive (OCA, registered trademark) film, or the like.

The substrates 100 at least include a first substrate 100a and a second substrate 100b. Each of the first substrate 100a and the second substrate 100b has a first face and a second face opposite to the first face. The second face of the first substrate 100a and the first face of the second substrate 100b are bonded together in the Z-Z' direction with the adhesive layer 200. The first substrate 100a and the second substrate 100b have been so treated as to serve as electrode base layers. The first substrate 100a and the second substrate 100b constitute an optical film laminate to be described.

The first substrate 100a and the second substrate 100b are formed of a film formed and biaxially stretched in an extrusion machine. Such biaxially-stretched film may be a polyethylene terephthalate (PET) film, a polypropylene (PP) film, a polyethylene naphthalate (PEN) film, a polyphenylene sulfide (PPS) film, polyimide (PI) film, polyether ether ketone (PEEK) film, a polyamide film, or the like. The first substrate 100a and the second substrate 100b have respective fast axes that are substantially parallel to each other. For example, the fast axes may extend within a range from 0° to 10°. The substrates 100 may further include at least one additional substrate, other than the first substrate 100a and the second substrate 100b. The or each additional substrate may be comprised of a biaxially-stretched film as described above, or a flexible film other than a biaxially-stretched film (for example, a film of a kind as described above but not biaxially stretched, or an optical film such as a high retardation film).

All the substrates 100 may be comprised of biaxially-stretched film as described above and have fast axes substantially parallel to each other (i.e. the fast axes extend within a range from 0° to 10°). More particularly, the substrates 100 may be arranged such that all of their fast axes extend (1) at an angle of about 45°, (2) substantially parallel, or (3) substantially orthogonal, to the polarization axis of the image display device D. In case (1), linearly-polarized light emitted from the image display device D is converted into circularly-polarized light (including elliptically-polarized light) by the substrates 100. Linearly-polarized light that has passed through a polarizing plate G varies in quantity depending on the axial relationship of the light to the polarizing plate G, while circularly-polarized light that has passed through a polarizing plate G is constant in quantity. As a result, the substrates 100 in case (1) improve recognition of visual information displayed by the image display device D through a polarizing plate G. In cases (2) and (3), the substrates 100 function as isotropic members, substantially maintaining the polarization property of linearly-polarized light emitted from the image display device D even after the light has passed through the substrates 100. Since a common image display device D has a polarization axis extending orthogonally to, or at an angle of 45° to, an absorption axis of a polarizing plate G, linearly-polarized light being emitted from an image display device D and passing through the substrates 100 will not be blocked by the polarizing plate G. As a result, the substrates 100 in cases (2) and (3) also improve recognition of visual information displayed by the image display device D through a polarizing plate G.

The touch sensing device T1 further includes a plurality of first electrodes 110a and a plurality of second electrodes 110b. The first electrodes 110a and the second electrodes 110b are electrodes for a capacitive touch sensing device T1. The first electrodes 110a may be transparent conductive films or conductors formed on the first face of the first substrate 100a such as to extend in the Y-Y' direction and be spaced from each other in the X-X' direction as shown in FIG. 1B. The second electrodes 110b may be transparent conductive films or conductors formed on the first face of the second substrate 100b such as to extend in the X-X' direction and be spaced from each other in the Y-Y' direction as shown in FIG. 1B. The second electrodes 110b may cross the first electrodes 110a at any angles, e.g. at right angles as shown in FIG. 1B. Also, an electrode protection layer (resist layer) may be further provided on the first face of the first substrate 100a so as to cover the first electrodes 110a.

The transparent conductive films mentioned above may be made of a material such as tin-doped indium oxide (ITO), carbon nanotubes (CNT), indium-doped zinc oxide (IZO), aluminum-doped zinc oxide (AZO), or conductive polymers such as PEDOT and PSS. The conductors mentioned above may specifically be photosensitive silver, silver nanoink, silver nanowires, vapor-deposited copper, rolled copper, copper nanoink, etc.

The touch sensing device T1 may further include a cover panel 300. The cover panel 300 is disposed on the Z-direction side with respect to the first substrate 100a. Particularly, as shown in FIG. 1A, the cover panel 300 may be adhered to the first substrates 100a with an adhesive layer 200 so as to be disposed on the Z-direction side with respect to the first substrate 100a.

Next, a first method for manufacturing the touch sensing device T1 will be described with reference to FIGS. 2 to 5B. The first method utilizes a material film F formed and biaxially stretched in an extrusion machine. The material film F may be, for example, a polyethylene terephthalate (PET) film, a polypropylene (PP) film, a polyethylene naphthalate (PEN) film, a polyphenylene sulfide (PPS) film, polyimide (PI), polyether ether ketone (PEEK), or a polyamide film, or the like. The material film F may be formed in a rolled form. The lengthwise direction of the material film F will be referred to as a machine direction (MD) of the material film F, and the widthwise direction of the material film F will be referred to as a transverse direction (TD) of the material film F.

Figure 3A:
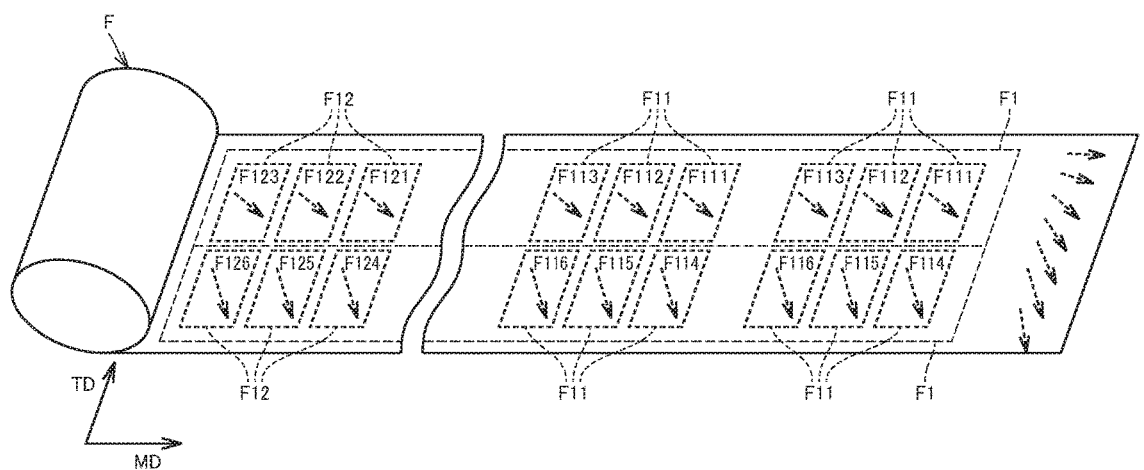
FIG. 3A is a perspective view of a process of forming a first electrode group in the first manufacturing method.
Figure 3B:
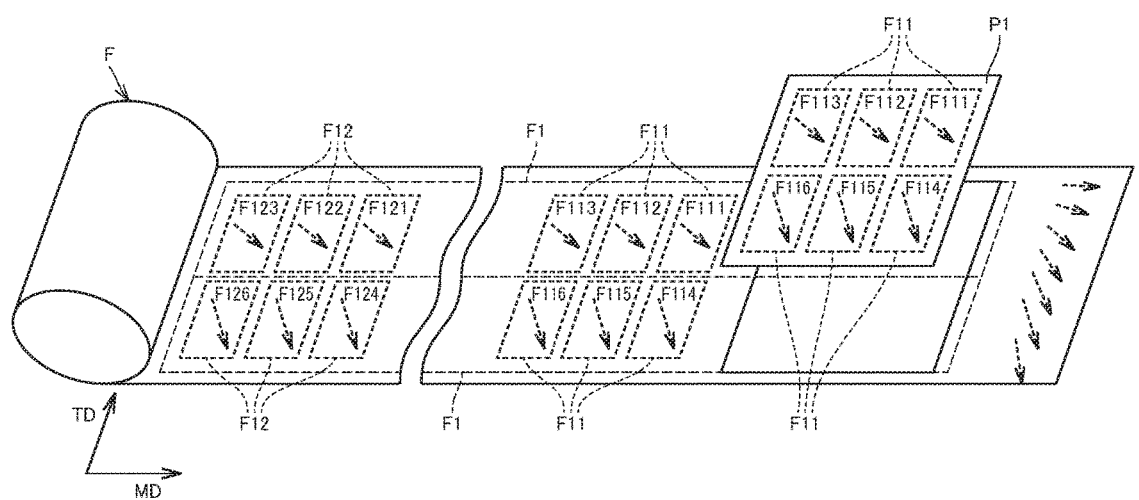
FIG. 3B is a schematic view of a process of creating a first piece in the first manufacturing method.

The material film F includes at least one available area F1 as shown in FIG. 3A. The or each available area F1 defines an area in the TD direction of the material film F and extends in the MD of the material film F. The or each available area F1 includes at least one first segment F11 and at least one second segment F12. The at least one first segment F11 and the at least one second segment F12 have the same shape and define different areas in the MD of the available area F1. In an available area F1 of the material film F, the position in the TD and the orientation of the or each first segment F11 are the same as those of the or each second segment F12, so that the or each first segment F11 entirely overlap the or each second segment F12 when bonded together as described below. FIG. 3A shows an embodiment in which the first and second segments F11, F12 are each of a rectangular shape, and the positions in the TD and the orientations of all the first and second segments F11, F12 are the same in each available area F1.

The first manufacturing method may have the following aspects A) to C). In any of the aspects, the method can be carried out with the material film F continuously moved in the MD in a roll-to-roll process or other manner, or with the MD end of the material film F pulled in the MD out of the rolled material film F. It is noted that FIGS. 3A to 5B show the available areas F1, the first segments F11, the second segments F12, and the fast axes of the first segments F11, the fast axes of the second segments F12, and the fast axis of the material film F in broken lines. FIGS. 3A to 5B do not show the first and second electrode groups (to be described) for convenience of illustration.

Method aspect A): The material film F is prepared (step S1). The material film F has an available area F1. The available area F1 includes at least one first segment F11 and at least one second segment F12. If the available area F1 includes a plurality of first segments F11 and a plurality of second segments F12, the first segments F11 are aligned in a row in the MD and the second segments F12 are aligned in a row in the MD. In the available area F1, the first segments F11 are arranged at the same spacing in the MD as the second segments F12.

A first electrode group is formed on a first face of the or each first segment F11 in the available area F1 (step S2). More specifically, the first electrode group can be formed using one of the following procedures 1) to 3). Procedure 1): a transparent conductive film or a conductor, of material as described above for the conductive films and conductors to form the first electrodes 110a, is formed on the first face of the entire material film F or on the first face(s) of the first segment(s) F11. Alternatively, the transparent conductive film or conductor may have been previously formed on the first face of the material film F prepared in step S 1. A resist is applied onto the transparent conductive film or conductor. The resist is subjected to exposure and development using a mask to form a pattern on the resist. The patterning is followed by etching the exposed regions (regions not covered by the mask) of the transparent conductive film or conductor to leave a pattern of the first electrode group on the first face of at least one first segment F11. The resist is subsequently removed. Procedure 2): A resist is applied onto the first face of the first segment F11 of the material film F. The resist is subjected to exposure and development using a mask to form a pattern on the resist. The patterning is followed by vapor deposition or the like to form conductors, i.e. the first electrode group, on the first face of at least one first segment F11. The resist is subsequently removed. Procedure 3): The first electrode group is printed on the first face of the material film F using a known printing method, such as a screen printing and an inkjet printing, for example. In this case, the first electrode group is conductors as described above. After making the first electrode group, the material film F is forwarded to a first cutting machine (not shown) to cut a piece (hereinafter referred to as the first piece P1) out of the material film F to make the first piece P1 including the at least one first segment F11 (making of the first piece P1, step S3, see FIG. 3B).

The second electrode group is formed on the first face of the or each second segment F12 using the same procedure as that for the first electrode group (step S4). Thereafter, the first cutting machine is used to cut a piece (hereinafter referred to as the second piece P2) out of the material film F to make the second piece P2 including the at least one second segment F12 (making of the second piece P2, step S5). It should be noted that steps S3 and S5 may be performed after steps S2 and S4.

Figure 4:
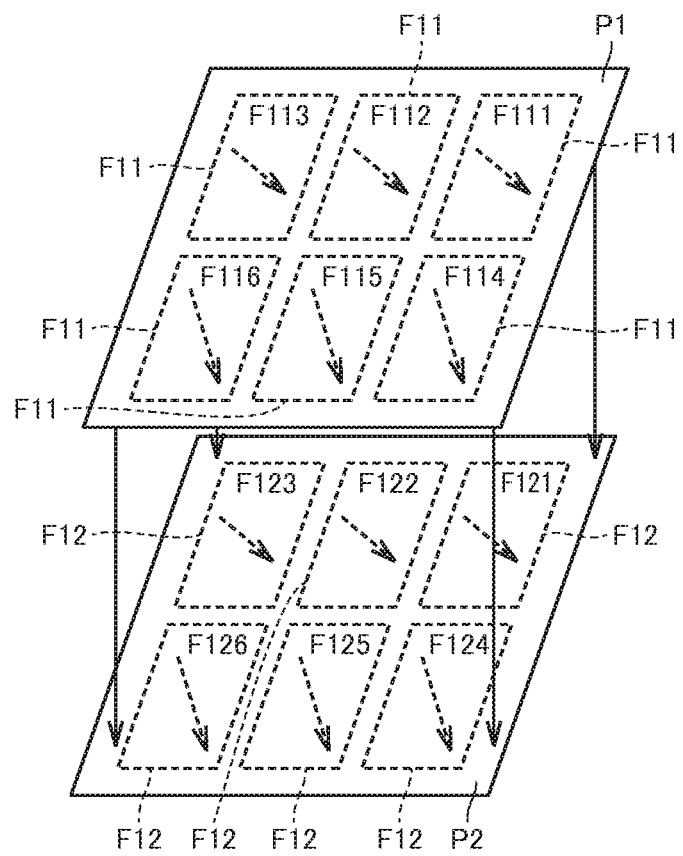
FIG. 4 is a schematic view of a process of bonding the first piece and a second piece in the first manufacturing method.

After making the first piece P1 and the second piece P2, the second face, opposite to the first face, of the at least one first segment F11 of the first piece P1 is bonded with an adhesive layer 200 to the first face of the at least one second segment F12 of the second piece P2, substantially maintaining the orientations of the at least one first segment F11 and the at least one second segment F12 as before the cutting, i.e. substantially maintaining the orientations of the first piece P1 and the second piece P2 as before the cutting (step S6, see FIG. 4). In this step S6, positioning of the at least one first segment F11 of the first piece P1 with respect to the at least one second segment F12 of the second piece P2 may be made by placing markings on the first piece P1 and corresponding markings on the second piece P2 beforehand and matching the markings of the first piece P1 with those of the second piece P2. Alternatively, positioning of the at least one first segment F11 of the first piece P1 with respect to the at least one second segment F12 of the second piece P2 may be made by matching the outer shape of the or the first piece P1 with that of the second piece P2. In this case, it is preferable that the first piece P1 and the second piece P2 be equal in TD and MD dimensions.

If the first piece P1 includes a plurality of first segments F11 and the second piece P2 includes a plurality of second segments F12, after bonding the first segments F11 to the corresponding second segments F12 in step S6, a second cutting machine (not shown) is used to cut sections out of the bonded first and second pieces P1, P2 such that the sections form respective optical film laminates each including a bonded set of a first segment F11 and a second segment F12 (step S7). If the first piece P1 includes a single first segment F11 and the second piece P2 includes a single second segment F12, bonding the first segment F11 to the second segment F12 provides an optical film laminate including one first segment F11 and one second segment F12. In this case, step S7 is omitted.

Method aspect B): The material film F is prepared (step S1). The material film F has a plurality of available areas F1 (see FIG. 3A). The available areas F1 is different areas in the TD of the material film F. Each available area F1 includes a first segment F11 and a second segment F12. In each two adjacent ones of the available areas F1, the first segments F11 are at the same positions in the MD, and the second segments F12 are at the same positions in the MD.

Subsequently, in a similar manner to the formation of the first electrode group as described for the above method aspect A), a first electrode group is formed on the first face of the first segment F11 in each available area F1 (step S2). Thereafter, the material film F is forwarded to a first cutting machine (not shown) to cut a piece (hereinafter referred to as the first piece P1) out of the material film F to make the first piece P1 extending over the plurality of available area F1 and accordingly including a plurality of first segments F11 (making of the first piece P1, step S3).

A second electrode group is also formed on the first face of the second segment F12 in each available area F1, in a similar manner to the formation of the second electrode group as described for the above method aspect A) (step S4). Thereafter, the first cutting machine is used to cut a piece (hereinafter referred to as the second piece P2) out of the material film F to make the second piece P2 extending over the plurality of available areas F1 and accordingly including a plurality of second segments F12 (making of the second piece P2, step S5). It should be noted that steps S3 and S5 may be performed after steps S2 and S4.

After making the first piece P1 and the second piece P2, the second faces of the first segments F11 in the available areas F1 of the first piece P1 are bonded with adhesive layers 200 to the respective first faces of the second segments F12 in the available areas F1 of the second piece P2, substantially maintaining the orientations of the first segments F11 and the second segments F12 as before the cutting, i.e. substantially maintaining the orientations of the first piece P1 and the second piece P2 as before the cutting (step S6). The first segment F11 and the second segment F12 of each bonded set are positioned in the same one of the available areas F1. For example, if the available areas F1 includes two available areas F1, the first segment F11 and the second segment F12 in one of the two available areas F1 are bonded together with an adhesive layer 200, and the first segment F11 and the second segment F12 in the other available area F1 are bonded together with an adhesive layer 200. Similarly, to step 6 of the method aspect A), step S6 of this method aspect B) may include positioning the first segments F11 with respect to the second segments F12 by matching markings of the first piece P1 with those of the second piece P2, or by matching the outer shape of the first piece P1 with that of the second piece P2.

Thereafter, a second cutting machine (not shown) is used to cut sections out of the bonded first and second pieces P1 and P2 such that the sections form respective optical film laminates each including a bonded set of a first segment F11 and a second segment F12 (step S7).

Method aspect C): The material film F is prepared (step S1). The material film F includes a plurality of available areas F1 as shown in FIG. 3A. Each available area F1 includes a plurality of first segments F11 and a plurality of second segments F12. In each available area F1, the first segments F11 are aligned in a row in the MD and the second segments F12 are aligned in a row in the MD. In each available area F1, the first segments F11 are arranged at the same spacing in the MD as the second segments F12.

Subsequently, a first electrode group is formed on the first face of each first segment F11 in each available area F1, in a similar manner to the formation of the first electrode group as described for the above method aspect A) (step S2). Thereafter, as shown in FIG. 3A, the material film F is forwarded to a first cutting machine (not shown) to cut a piece (hereinafter referred to as the first piece P1) out of the material film F to make the first piece P1 including a plurality of first segments F11 arranged in a plurality of available areas F1 (making of the first piece P1, step S3). More particularly, the first piece P1 includes a plurality of rows corresponding to the respective available areas F1, and each row has a plurality of first segments F11 aligned in the MD. In other words, the first piece P1 extends over the plurality of available areas F1 and accordingly includes the plurality of first segments F11.

A second electrode group is formed on the first face of each second segment F12 in each available areas F1, in a similar manner to the formation of the second electrode group as described for the above method aspect A) (step S4). Thereafter, the first cutting machine is used to cut a piece (hereinafter referred to as the second piece P2) out of the material film F to make the second piece P2 including a plurality of second segments F12 arranged in the plurality of available areas F1 (making of the second piece P2, step S5). More particularly, the second piece P2 includes a plurality of rows corresponding to the respective available areas F1, and each row has a plurality of second segments F12 aligned in the MD. In other words, the second piece P2 extends over the plurality of available areas F1 and accordingly includes the plurality of second segments F12. It should be noted that steps S3 and S5 may be performed after steps S2 and S4.

After making the first piece P1 and the second piece P2, as shown in FIG. 4, the second faces of the first segments F11 in the rows in the first piece P1 are bonded to the first faces of the second segments F12 in the rows in the second piece P2 with adhesive layers 200, substantially maintaining the orientations of the first segments F11 and the second segments F12 as before the cutting, i.e. substantially maintaining the orientations of the first piece P1 and the second piece P2 as before the cutting (step S6). The first segments F11 in each row (i.e. in each available area F1) are bonded to the respective second segments F12 in the same one of the rows, (i.e. in the same one of the available areas F1). FIG. 4 shows a case in which the available areas F1 includes two available areas F1, in one of which (the upper row as shown in FIG. 4) includes a plurality of first segments F11 (particularly referred to as first segments F111, F112, and F113) and a plurality of second segments F12 (particularly referred to as second segments F121, F122, and F123). The other available areas F1 (the lower row as shown in FIG. 4) also includes a plurality of first segments F11 (particularly referred to as first segments F114, F115, and F116) and a plurality of second segments F12 (particularly referred to as second segments F124, F125, and F126). In step S6, the first segments F111, F112, and F113 in the upper row are respectively bonded with adhesive layers 200 to the second segments F121, F122, and F123 in the upper row, and the first segments F114, F115, and F116 in the lower row are respectively bonded with adhesive layers 200 to the second segments F124, F125, and F126 in the lower row. Similarly, to step 6 of the method aspect A), step S6 of this method aspect C) may include positioning the first segments F11 with respect to the second segments F12 by matching markings of the first piece P1 with those of the second piece P2, or by matching the outer shape of the first piece P1 with that of the second piece P2.

Figure 5A:
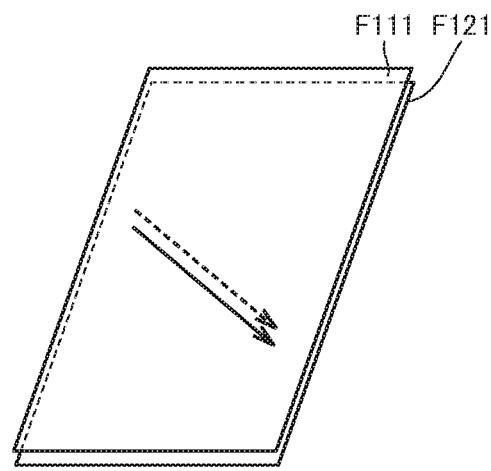
FIG. 5A is a schematic perspective view of an optical film laminate, formed by bonding the first and second pieces, in the first manufacturing method.
Figure 5B:
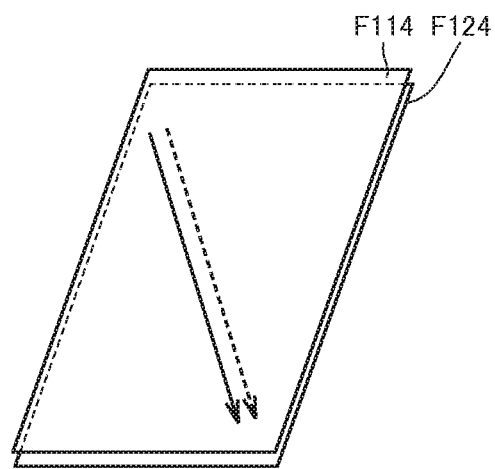
FIG. 5B is a schematic perspective view of another optical film laminate, formed by bonding the first and second pieces, in the first manufacturing method.

Thereafter, as shown in FIGS. 5A and 5B, a second cutting machine (not shown) is used to cut sections out of the bonded first and second pieces P1, P2 such that the sections form respective optical film laminates each including one bonded set of the first segment F11 and the second segment F12 (step S7). FIG. 5A shows an optical film laminate including a bonded set of first and second segments F111, F121, which are illustrated as separate from each other for convenience of illustration. Likewise, FIG. 5B shows an optical film laminate including a bonded set of first and second segments F114, F124 which are illustrated as separate from each other for convenience of illustration.

The or each optical film laminate thus obtained serves as the touch sensing device T1 as described above. More particularly, the first segment F11 and the second segment F12 serve as the first substrate 100a and the second substrate 100b, respectively. The first substrate 100a and the second substrate 100b have respective fast axes that are substantially parallel to each other (i.e. the fast axes extend within a range from 0° to 10°). Each first electrode group on the first face of the first substrate 100a serves as the first electrodes 110a, and each second electrode group on the first face of the second substrate 100b serves as the second electrodes 110b. If the touch sensing device T1 includes the cover panel 300, the manufacture of the touch sensing device T1 may preferably include, after obtaining the at least one optical film laminate (after step S7 in any of the above method aspects A) to C)), bonding the cover panel 300 with an adhesive layer 200 to the first face of the first substrate 100a of the optical film laminate.

Figure 6:
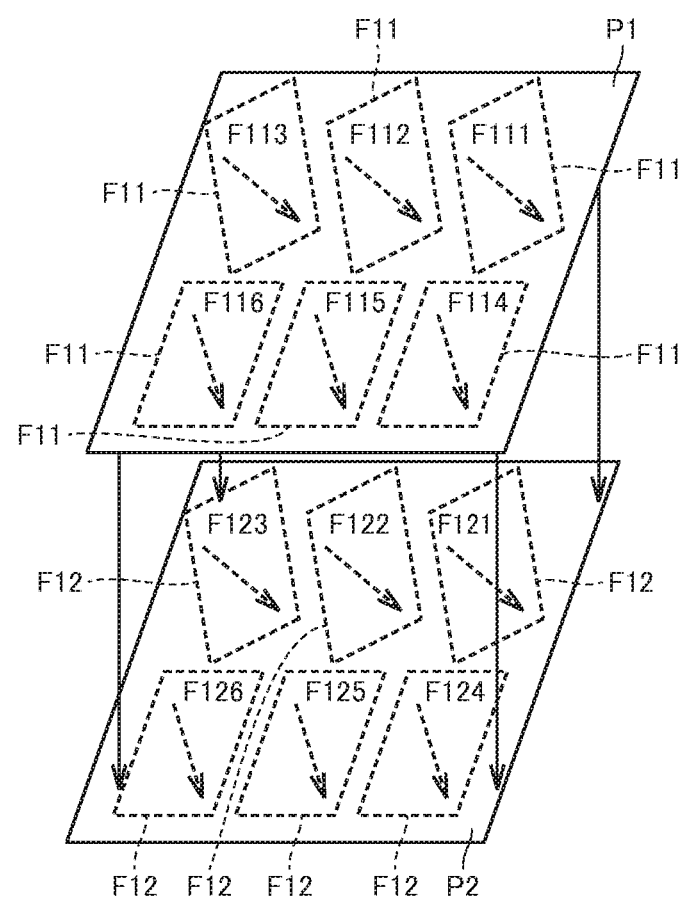
FIG. 6 is a schematic view of a variant of the first manufacturing method, showing two available areas, in which the first and second pieces in one of the available areas are oriented at an angle to the first and second pieces in another available area.
Figure 7A:
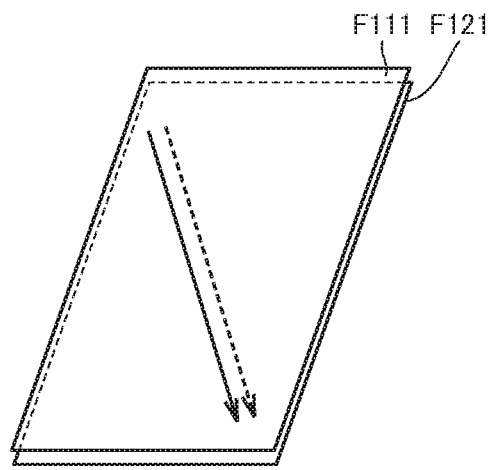
FIG. 7A is a schematic perspective view of an optical film laminate, formed by bonding the first and second pieces, in the above variant of the first manufacturing method.
Figure 7B:
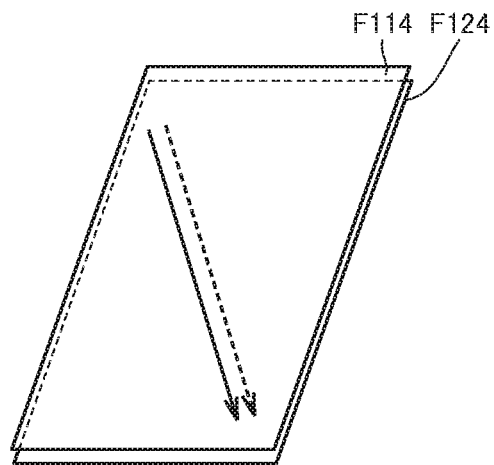
FIG. 7B is a schematic perspective view of another optical film laminate, formed by bonding the first and second pieces, in the variant of the first manufacturing method.

Moreover, if the available areas F1 includes a first available area F1 and a second available area F1, each first segment F11 and each second segment F12 in the first available area F1 may be oriented at an angle to each first segment F11 and each second segment F12 is the second available area F1, so that each first segment F11 and each second segment F12 obtained from the first available area F1 have respective fast axes that are substantially parallel to the respective fast axes of each first segment F11 and each second segment F12 obtained from the second available area F1. Optical film laminates with such first and second segments can be manufactured by aspects B) or C) of the first manufacturing method. For example, FIG. 6 shows a variant in which the first segments F111, F112, and F113 and the second segments F121, F122, and F123 obtained from a first available area F1 (in the back row as shown) are oriented at an angle to the first segments F114, F115, and F116 and the second segments F124, F125, and F126 obtained from a second available area F1 (in the front row as shown), so that the first segments F111, F112, and F113 and the second segments F121, F122, and F123 in the first available area F1 have a fast axis that is substantially parallel to the fast axis of the first segments F114, F115, and F116 and the second segments F124, F125, and F126 in the second available area F1. The first available area F1 provides optical film laminates as shown in FIG. 7A, the second available area F1 provides optical film laminates 4 as shown in FIG. 7B. It should be noted here that the fast axes of the first and second segments of the optical film laminates shown in FIG. 7A are parallel to the fast axes of the first and second segments of the optical film laminates shown in FIG. 7B.

Figure 8:
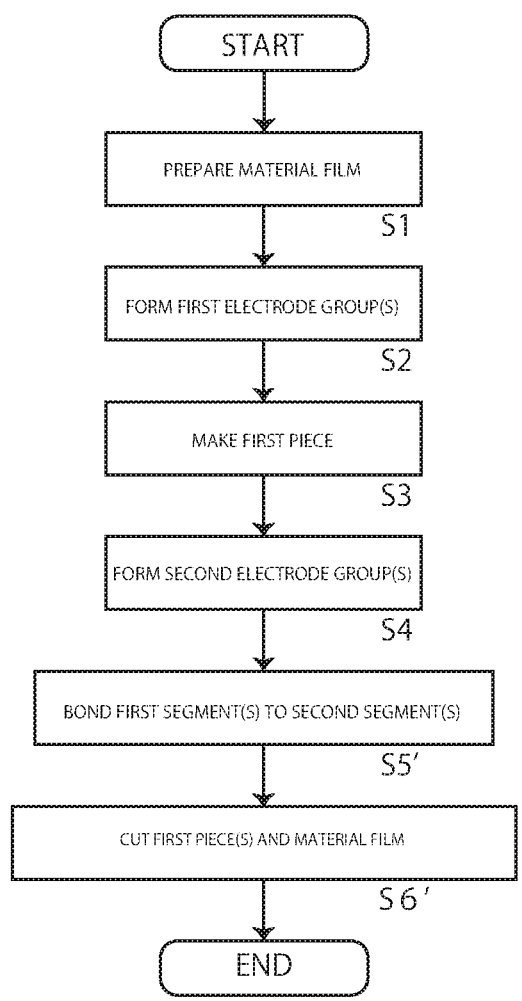
FIG. 8 is a flowchart of a second method for manufacturing the touch sensing device.

Next, a second method for manufacturing the touch sensing device T1 will be described with reference to FIG. 8. The second method is different from the first method in that step S5 is omitted (the second piece P2 will not be formed) and that steps S6 to S7 are replaced with steps S5' and S6'. These differences will be described in detail below, particularly as method aspects A) to C), and the steps of the second method that are identical to those of the first method will not be repeated. The method aspects A) to C) of the second method respectively correspond to the method aspects A) to C) of the first method. It is also noted that step S4 of the second method may be performed after step S3 as shown in FIG. 8 or before step S3.

Method aspect A): After steps S3 and S4 as described above, the second face of the at least one first segment F11 of the first piece P1 is bonded with an adhesive layer 200 to the first face of the at least one second segment F12 in the material film F, substantially maintaining the orientation of the at least one first segment F11 as before the cutting, i.e. substantially maintaining the orientation of the first piece P1 as before the cutting (step S5'). This step S5' may include positioning the at least one first segment F11 of the first piece P1 with respect to the at least one second segment F12 in the material film F by placing markings on the first piece P1 and corresponding markings on the material film F beforehand and matching the markings of the first piece P1 with those of the material film F.

If the first piece P1 includes a single first segment F11 and the material film F includes a single second segment F12, a second cutting machine (not shown) is used to cut a section out of bonded structure of the first piece P1 and the material film F such that the section forms an optical film laminate including one bonded set of the first segment F11 and the second segment F12 (step S6'). If the first piece P1 includes a plurality of first segments F11 and the material film F includes a plurality of second segments F12, a second cutting machine is used to cut sections out of bonded structure of the first piece P1 and the material film F such that the sections form respective optical film laminates each including a bonded set of a first segment F11 and a second segment F12 (step S6').

Method aspect B): After steps S3 and S4 as described above, the second faces of the first segments F11 in the available areas F1 of the first piece P1 are bonded with an adhesive layer 200 to the respective first faces of the second segments F12 in the available areas F1 in the material film F, substantially maintaining the orientations of the first segments F11 as before the cutting, i.e. substantially maintaining the orientation of the first piece P1 as before the cutting (step S5'). The first segment F11 and the second segment F12 of each bonded set are positioned in the same one of the available areas F1. For example, if the available areas F1 includes two available areas F1, the first segment F11 and the second segment F12 in one of the two available areas F1 are bonded together with an adhesive layer 200, and the first segment F11 and the second segment F12 in the other available area F1 are bonded together with an adhesive layer 200. Similarly, to step S5' of the method aspect A), step S5' of this method aspect B) may include positioning the first segments F11 with respect to the second segments F12 by matching markings of the first piece P1 with those of the material film F.

Thereafter, a second cutting machine is used to cut sections out of bonded structure of the first piece P1 and the material film F such that the sections form respective optical film laminates each including a boned pair of a first segment F11 and a second segment F12 (step S6').

Method aspect C): After steps S3 and S4 as described above, the second faces of the first segments F11 in the rows in the first piece P1 are bonded with an adhesive layer 200 to the respective first faces of the second segments F12 in the material film F, substantially maintaining the orientations of the first segments F11 as before the cutting, i.e. substantially maintaining the orientations of the first piece P1 as before the cutting (step S5'). The first segments F11 in each row (i.e. in each available area F1) are bonded to the second segments F12 in the same one of the rows, (i.e. in the same one of the available areas F1). For example, if the available areas F1 includes two (first and second) available areas F1, the first segments F11 in the first available areas F1 are bonded with an adhesive layer 200 to the respective second segments F12 in the first available areas F1, and the first segments F11 in the second available areas F1 are bonded with an adhesive layer 200 to the respective second segments F12 in the second available areas F1 Similarly, to step S5' of the method aspect A), step S5' of this method aspect C) may include positioning the first segments F11 with respect to the second segments F12 by matching markings of the first piece P1 with those of the material film F.

Thereafter, a second cutting machine is used to cut sections out of bonded structure of the first piece P1 and the material film F such that the sections form respective optical film laminates each including a boned pair of a first segment F11 and a second segment F12 (step S6').

The or each optical film laminate thus obtained also serves as the touch sensing device T1 as described above. More particularly, each first segment F11 and each second segment F12 serve as the first substrate 100a and the second substrate 100b, respectively. The first substrate 100a and the second substrate 100b have respective fast axes that are substantially parallel to each other (e.g. the fast axes may extend within a range from 0° to 10°). The first electrode group on the first face of the first substrate 100a serves as the first electrodes 110a, and the second electrode group on the first face of the second substrate 100b serves as the second electrodes 110b. If the touch sensing device T1 includes the cover panel 300, the manufacture of the touch sensing device T1 may preferably include, after obtaining the at least one optical film laminate (after step S6' in any of the above method aspects A) to C)), bonding the cover panel 300 with an adhesive layer 200 to the first face of the first substrate 100a of the optical film laminate.

Moreover, in the material film F used in the second manufacturing method, if the available areas F1 include a first available area F1 and a second available area F1, similarly to the first method, the or each first segment F11 and the or each second segment F12 in the first available area F1 may be oriented at an angle to those in the second available area F1, so that the or each first segment F11 and the or each second segment F12 obtained from the first available area F1 have fast axes that are substantially parallel to the fast axes of the or each first segment F11 and the or each second segment F12 obtained from the second available area F1 (see FIG. 6).

The touch sensing device T1, the first manufacturing method, and the second manufacturing method which have been described above provide at least the following technical features and effects. Firstly, the two bonded substrates 100 of a touch sensing device T1 have fast axes that extend substantially in the same direction, i.e. the misalignment of the fast axes is minimized. The inventors learned that in a biaxially-stretched material film F having an available area F1 that is an area in the widthwise direction of the material film F, if first segments F11 and second segments F12 are taken from anywhere in the lengthwise direction in the available area F1 (for example, whether taken from a portion at a distance of 1 meter or 100 mm from a lengthwise end of the material film F), the first and second segments F11, F12 have fast axes that extend substantially in the same direction (within a range of about 3°). Accordingly, by bonding a first segment F11 and a second segment F12 in the same available area F1 to use them as two substrates 100 of a touch sensing device, the misalignment of the fast axes between the two substrates 100 is minimized. It should be appreciated that in the context of the invention, it is sufficient if variation in fast axis between a first segment F11 and a second segment F12 in an available area F1 falls within a range of 10°.

Secondly, the touch sensing device T1 is suitable for mass production for the following reasons. As described above, the first segment F11 and the second segment F12 of the touch sensing device T1 are simply taken from different areas in the lengthwise direction of the same available area F1 and bonded together, there is no need to measure or otherwise determine the orientations of the fast axes of the first segment F11 and the second segment F12. If the material film F includes a plurality of available areas F1 and each available area F1 includes at least one first segment F11 and at least one second segment F12, or if an available area F1 of the material film F includes a plurality of first segments F11 and a plurality of second segments F12, it is possible to obtain a plurality of optical film laminates each including a first segment F11 and a second segment F12 by batch, by bonding a plurality of first segments F11 to counterpart second segments F12. Such optical film laminates are suitable for mass production of the touch sensing devices T1.

Thirdly, if the available areas F1 include the first available area F1 and the second available area F1, the fast axes of the first and second segments F111, F121 of an optical film laminate obtained from the first available area F1 are substantially parallel to the fast axes of the first and second segments F114, F124 of an optical film laminate obtained from the second available area F1. This configuration is achieved by orienting the first and second segments F111, F121 in the first available area F1 with respect to the first and second segments F114, F124 in the second available area F1 in such a manner that the fast axes of the first and second segments F111, F121 of an optical film laminate obtained from the first available area F1 are substantially parallel to the fast axes of the first and second segments F114, F124 of an optical film laminate obtained from the second available area F1.

Fourthly, there is no need to make the second piece P2 in the second manufacturing method. Accordingly, it is possible to manufacture optical film laminates in a reduced number of steps.

Second Embodiment

Figure 9:
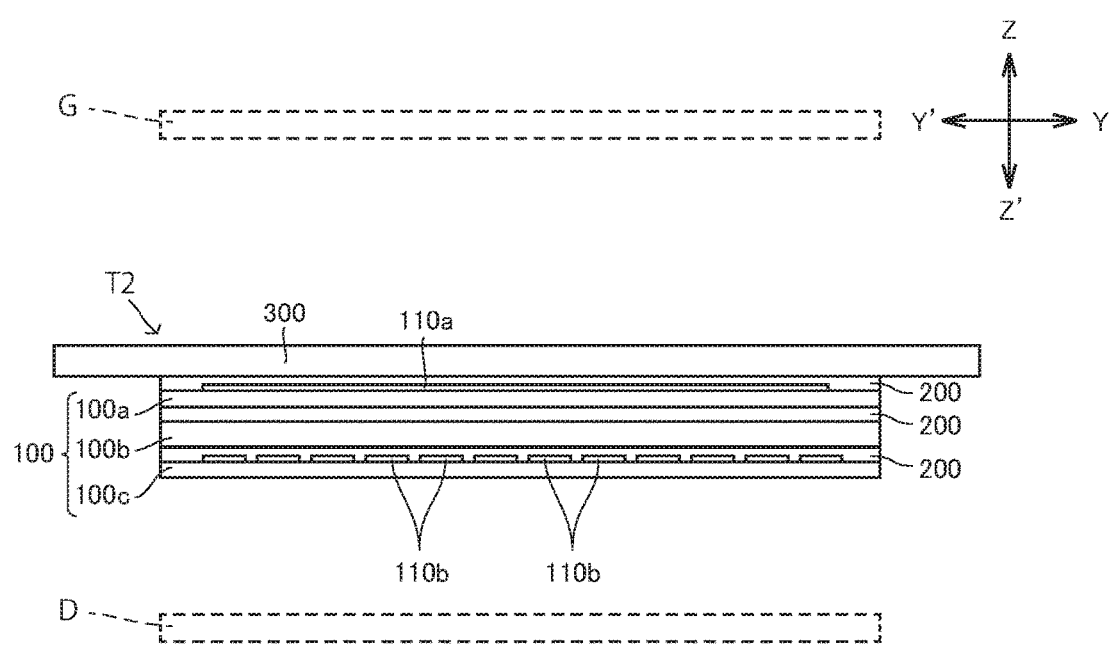
FIG. 9 is a schematic cross-sectional view of a touch sensing device according to a second embodiment of the invention, showing a positional relationship between the touch sensing device, an image display device, and a polarizing plate.

The following describes a touch sensing device T2 according to various embodiments including the second embodiment of the invention with reference to FIG. 9. FIG. 9 shows a touch sensing device T2 according to the second embodiment. The touch sensing device T2 has the same configuration as the touch sensing device T1 except for the following differences. The first difference is that the plurality of substrates 100 further includes a third substrate 100c. The second difference is that a plurality of (at least two) adhesive layers 200 are provided. The third difference is that the second electrodes 110b are formed on the first face of the third substrate 100c. These differences will be discussed in detail below, without repeating the description of the same configurations those of the touch sensing device T1. FIG. 9 also indicates the Z-Z' and Y-Y' directions. The X-X' direction is defined as indicated in FIG. 1B.

The third substrate 100c is formed of a biaxially-stretched film similar to the first and second substrates 100a, 100b. The third substrate 100c has a first face and a second face opposite to the first face. The first substrate 100a, the second substrate 100b, and the third substrate 100c are stacked in the Z-Z' direction in this order. In other words, the second face of the first substrate 100a and the first face of the second substrate 100b are bonded together with an adhesive layer 200 (first adhesive layer), and the first face of the third substrate 100c and the second face of the second substrate 100b are bonded together with another adhesive layer 200 (second adhesive layer). The first substrate 100a, the second substrate 100b, and the third substrate 100c have fast axes substantially parallel to each other. For example, the fast axes may extend within a range from 0° to 10°.

The second electrodes 110b are formed on the first face of the third substrate 100c. The second electrodes 110b may be transparent conductive films or conductors, configured as described above for the touch sensing device T1, and extend in the X-X' direction and be spaced from each other in the Y-Y' direction. The second electrodes 110b may cross the first electrodes 110a at any angles, e.g. at right angles.

Figure 10:
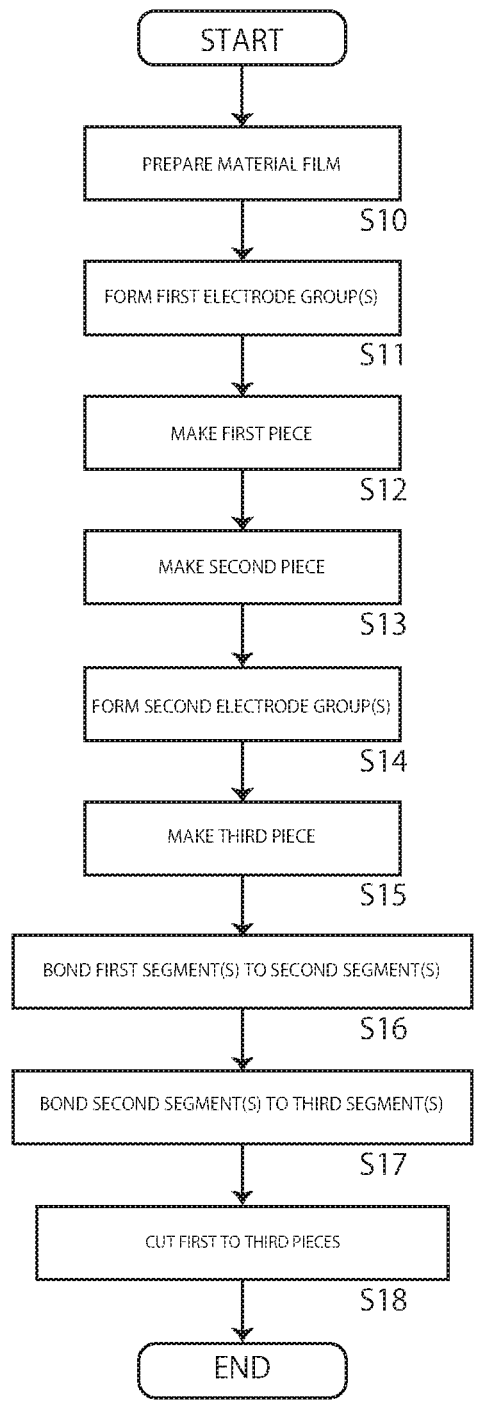
FIG. 10 is a flowchart of a third method for manufacturing the touch sensing device.
Figure 11:
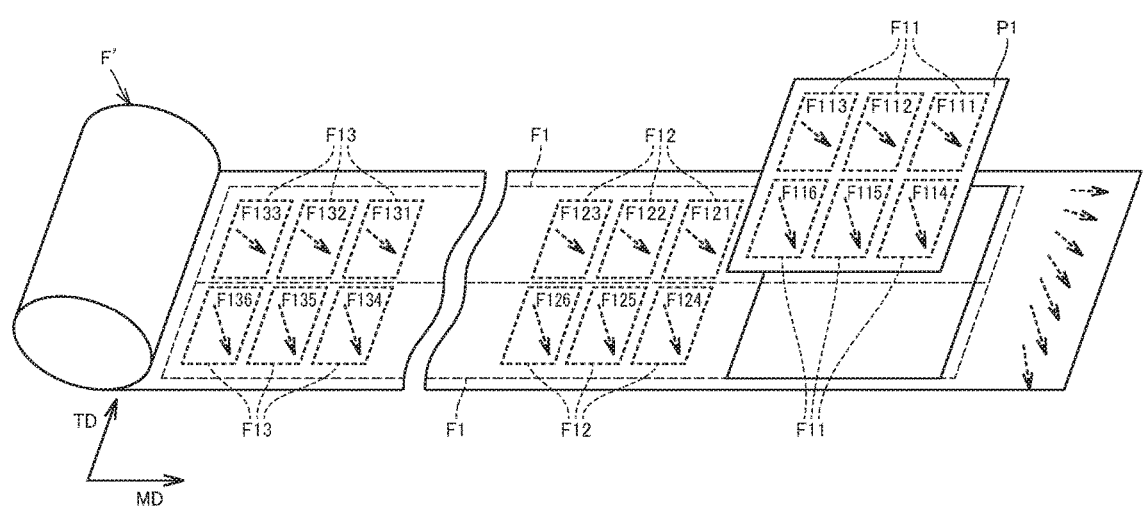
FIG. 11 is a schematic view of a process of creating a first piece in the third manufacturing method.

Next, a third method for manufacturing at least one optical film laminate of the touch sensing device T2 will be described with reference to FIGS. 10 to 12. The third manufacturing method utilizes a material film F' formed and biaxially stretched in an extrusion machine. As shown in FIG. 11, the material film F' is similar to the material film F, different only in that the or each available area F1 includes at least one first segment F11, at least one second segment F12, and at least one third segment F13. The at least one first segment F11, the at least one second segment F12, and the at least one third segment F13 have the same shape and define different areas in the MD (lengthwise direction) of the available area F1. In an available area F1 of the material film F', the position in the TD (widthwise direction) and the orientation of the or each first segment F11 are the same as those of the or each second segment F12, so that the or each first segment F11 entirely overlap the or each second segment F12 when bonded together as described below, and the position in the TD (widthwise direction) and the orientation of the or each second segment F12 are the same as those of the or each third segment F13, so that the or each second segment F12 entirely overlap the or each third segment F13 when they are bonded together as described below. FIG. 11 shows an embodiment in which the first, second, and third segments F11, F12, and F13 are each of a rectangular shape, and the positions in the TD and the orientations of all first, second, and third segments F11, F12, and F13 are the same in each available area F1.

The third manufacturing method may have the following aspects A) to C). In any of the aspects, the method can be carried out with the material film F' continuously moved in the MD in a roll-to-roll process or other manner, or with the MD end of the material film F' pulled in the MD out of the rolled material film F'. It is noted that FIGS. 11 and 12 show the available areas F1, the first segments F11, the second segments F12, the third segments F13, and the fast axes of the first segments F11, the fast axes of the second segments F12, the fast axes of the third segments F13, and the fast axis of the material film F' in broken lines. FIGS. 11 and 12 do not show the first and second electrode groups for convenience of illustration.

Method aspect A): The material film F' is prepared (step S10). The material film F' has an available area F1. The available area F1 includes at least one first segment F11, at least one second segment F12, and at least one third segment F13. If the available area F1 includes a plurality of first segments F11, a plurality of second segments F12, and a plurality of third segments F13, the first segments F11 are aligned in a row in the MD, the second segments F12 are aligned in a row in the MD, and the third segments F13 are aligned in a row in the MD. In the available area F1, the first, second, and third segments F11, F12, and F13 are arranged at the same spacing in the MD.

A first electrode group is formed on the first face of the or each first segment F11 in the available area F1 (step S11) in a similar manner to the step S2 of the method aspect A) of the first manufacturing method. Subsequently, the material film F' is forwarded to a first cutting machine (not shown) to cut a piece (hereinafter referred to as the first piece P1) out of the material film F' to make the first piece P1 including the at least one first segment F11 (making of the first piece P1, step S3, see FIG. 11).

Subsequently, the first cutting machine is used to cut a piece (hereinafter referred to as the second piece P2) out of the material film F' to make the second piece P2 including the at least one second segment F12 (making of the second piece P2, step S13). If a transparent conductive film or a conductor as described above is already formed on the first face of the material film F' in step 10, step 13 may be preceded by removing the portion of the transparent conductive film or conductor on the first face of the or each second segment F12 by etching or other process.

Subsequently, a second electrode group is formed on the first face of the or each third segment F13 using the same procedure as that for the first electrode group (step S14). Thereafter, the first cutting machine is used to cut a piece (hereinafter referred to as the third piece P3) out of the material film F' to make the third piece P3 including at least one third segment F13 (making of the third piece P3, step S15). It should be noted that steps S12, S13, and S15 may be performed after steps S11 and S14.

After making the first piece P1 and the second piece P2, in a similar manner to the step S6 of the method aspect A) of the first manufacturing method, the second face, opposite to the first face, of the at least one first segment F11 of the first piece P1 is bonded with an adhesive layer 200 to the first face of the at least one second segment F12 of the second piece P2 (step S16, see FIG. 4).

Figure 12:
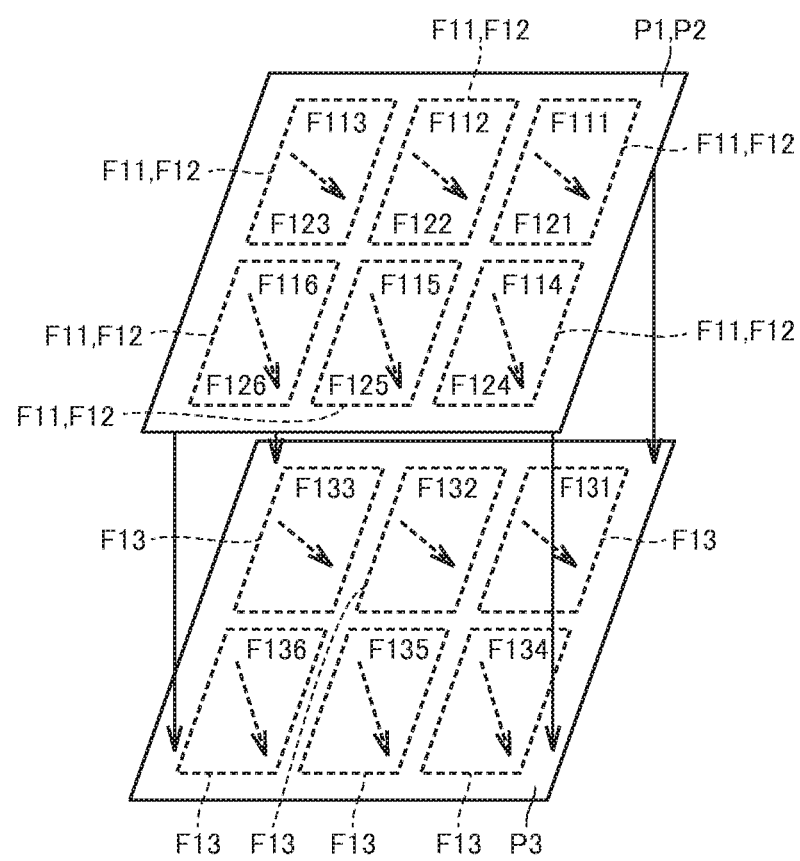
FIG. 12 is a schematic view of a process of bonding a second piece and a third piece in the third manufacturing method.

After step S16, the second face, opposite to the first face, of the at least one second segment F12 of the second piece P2 is bonded with an adhesive layer 200 to the first face of the at least one third segment F13 of the third piece P3, substantially maintaining the orientations of the first, second, and third segments F11, F12, and F13 as before the cutting, i.e. substantially maintaining the orientations of the first, second, and third pieces P1, P2, and P3 as before the cutting (step S17, see FIG. 12). Similarly, to the step S2 of the method aspect A) of the first manufacturing method, this step S17 of this method aspect may include positioning the at least one second segment F12 with respect to the at least one third segment F13 by matching markings of the second piece P2 with those of the third piece P3, or by matching the outer shape of the first, second, and third pieces P1, P2, P3.

If the first piece P1 includes a plurality of first segments F11, the second piece P2 includes a plurality of second segments F12, and the third piece P3 includes a plurality of third segments F13, after bonding the second segments F12 to the respective third segments F13 in step S17, a second cutting machine (not shown) is used to cut sections out of the bonded first, second, and third pieces P1, P2, P3 such that the sections form respective optical film laminates each including a bonded set of a first segment F11, a second segment F12, and a third segment F13 (step S18). If the first piece P1 includes a single first segment F11, the second piece P2 includes a single second segment F12, and the third piece P3 includes a single third segment F13, the bonding of the first, second, and third segment F11, F12, and F13 results in providing an optical film laminate including one first segment F11, one second segment F12, and one third segment F13. In this case, step S18 is omitted.

Method aspect B): The material film F' is prepared (step S10). The material film F' has a plurality of available areas F1 see FIG. 10). The available areas F1 are different areas in the TD of the material film F'. Each available area F1 includes a single first segment F1, a single second segment F12, and a single third segment F13. In each two adjacent ones of the available areas F1, the first segments F11 are at the same positions in the MD, and the second segments F12 are at the same positions in the MD, and the third segments F13 are at the same positions in the MD.

Subsequently, in a similar manner to the formation of the first electrode group as described for the above method aspect A) of the first manufacturing method, a first electrode group is formed on the first face of the first segment F11 in each available area (step S11). Thereafter, the material film F' is forwarded to a first cutting machine (not shown) to cut a piece (hereinafter referred to as the first piece P1) out of the material film F' to make the first piece P1 extending over the plurality of available areas F1 and accordingly including a plurality of first segments F11 (making of the first piece P1, step S12).

Subsequently, the first cutting machine is used to a piece (hereinafter referred to as the second piece P2) out of the material film F' to make the second piece P2 extending over the plurality of available areas F1 and accordingly including a plurality of second segments F12 (making of the second piece P2, step S13). If a transparent conductive film or a conductor as described above is already formed on the first face of the material film F' in step 10, step 13 may be preceded by removing the portion of the transparent conductive film or conductor on the first faces of the second segments F12 by etching or other process.

Subsequently, a second electrode group is formed on the first face of the third segment F13 in each available area F1, using a similar procedure as that for the second electrode group in the method aspect A) above (step S14). Thereafter, the first cutting machine is used to cut a piece (hereinafter referred to as the third piece P3) out of the material film F' to make the third piece P3 extending over the plurality of available areas F1 and accordingly including a plurality of third segments F13 (making of the third piece P3, step S15). It should be noted that steps S12, S13, and S15 may be performed after steps S11 and S14.

Subsequently, in a similar manner to step S6 of the method aspect B) of the first manufacturing method, the second faces of the first segments F11 in the available areas F1 are bonded with adhesive layers 200 to the respective first faces of the second segments F12 in the available areas F1 (step S16). The first segment F11 and the second segment F12 of each bonded set are positioned in the same one of the available areas F1.

After step S16, the second faces of the second segments F12 in the first available areas F1 are bonded with adhesive layers 200 to the respective first faces of the third segments F13 in the available areas F1, substantially maintaining the orientations of the first, second, and third segments F11, F12, F13 in the available areas F1 as before the cutting, i.e. substantially maintaining the orientations of the first, second, and third pieces P1, P2, P3 as before the cutting (step S17). The second segment F12 and the third segment F13 of each bonded set are positioned in the same one of the available areas F1. For example, if the available areas F1 includes two available areas F1, the second segment F12 and the third segment F13 in one of the two available areas F1 are bonded together with an adhesive layer 200, and also the second segment F12 and the third segment F13 in the other available area F1 are bonded together with an adhesive layer 200 Similarly, to step S17 of the method aspect A) of the third manufacturing method, step S17 of this method aspect B) may include positioning the second segments F12 with respect to the third segments F13 by matching markings of the second piece P2 with those of the third piece P3 or by matching outer shapes of the first, second, and third pieces P1, P2, P3.

Thereafter, a second cutting machine (not shown) is used to cut sections out of the bonded first, second, and third pieces P1, P2, P3 such that the sections form respective optical film laminates each including a bonded set of a first segment F11, a second segment F12, and a third segment F13 (step S18).

Method aspect C): The material film F' is prepared (step S10). The material film F' includes a plurality of available areas F1 as shown in FIG. 11. Each of the available areas F1 includes a plurality of first segments F11, a plurality of second segments F12, and a plurality of third segments F13. In each available area F1, the first segments F11 are aligned in a row in the MD, the second segments F12 are aligned in a row in the MD, and the third segments F13 are aligned in a row in the MD. In each available area F1, the first segments F11, the second segments F12, and the third segments F13 are arranged at the same spacing in the MD.

Subsequently, a first electrode group is formed on the first face of each first segment F11 in each available area F1, in a similar manner to in the formation of the first electrode group as described for the above method aspect A) (step S11). Subsequently, the material film F' is forwarded to a first cutting machine (not shown) to cut a piece (hereinafter referred to as the first piece P1) out of the material film F' as shown in FIG. 11 to make the first piece P1 including a plurality of first segments F11 arranged in a plurality of available areas F1 (making of the first piece P1, step S12). More particularly, the first piece P1 includes a plurality of rows corresponding to the respective available areas F1, and each row has a plurality of first segments F11 aligned in the MD. In other words, the first piece P1 extends over the plurality of available areas F1 and accordingly includes the plurality of first segments F11.

Subsequently, the first cutting machine is used to cut a piece (hereinafter referred to as the second piece P2) out of the material film F' to make the second piece P2 including a plurality of second segments F12 arranged in the plurality of available areas F1 (making of the second piece P2, step S13). More particularly, the second piece P2 includes a plurality of rows corresponding to the respective available areas F1, and each row has a plurality of second segments F12 aligned in the MD. In other words, the second piece P2 extends over the plurality of available areas F1 and accordingly includes the plurality of second segments F12. If a transparent conductive film or a conductor as described above is already formed on the first face of the material film F' in step 10, step 13 may be preceded by removing the portion of the transparent conductive film or conductor on the first face of each second segment F12 by etching or other process.

Also, a second electrode group is formed on the first face of each third segment F13 in each available areas F1 using a similar procedure as that for the second electrode group in the method aspect A) above (step S14). Thereafter, the first cutting machine is used to cut a piece (hereinafter referred to as the third piece P3) out of the material film F' to make the third piece P3 including a plurality of third segments F13 arranged in the plurality of available areas F1 (making of the third piece P3, step S15). More particularly, the third piece P3 includes a plurality of rows corresponding to the respective available areas F1, and each row has a plurality of third segments F13 aligned in the MD. In other words, the third piece P3 extends over the plurality of available areas F1 and accordingly includes the plurality of third segments F13. It should be noted that steps S12, S13, and S15 may be performed after steps S11 and S14.

Subsequently, in a similar manner to in step S6 of the method aspect C) of the first manufacturing method, the second faces of the first segments F11 are bonded with adhesive layers 200 to the respective first faces of the second segments F12 (step S16). The first segments F11 in each row (i.e. in each available area F1) are bonded to the second segment F12 in the same one of the rows, (i.e. in the same one of the available areas F1).

Thereafter, the second faces of the second segments F12 in the rows in the first piece P1 are bonded with adhesive layers 200 to the respective first faces of the third segments F13 in the rows in the third piece P3, substantially maintaining the orientations of the first, second, and third segments F11, F12, F13 in the plurality of rows as before the cutting, i.e. substantially maintaining the orientations of the first, second, and third pieces P1, P2, P3 as before the cutting (step S17). The second segments F12 in each row (i.e. in each available area F1) are bonded to the respective third segments F13 in the same one of the rows, (i.e. in the same one of the available areas F1). FIG. 11 shows a case in which the available areas F1 includes two available areas F1, one of which (the upper row as shown in FIG. 11) includes a plurality of second segments F12 (particularly referred to as second segments F121, F122, and F123) and a plurality of third segments F13 (particularly referred to as third segments F131, F132, and F133). The other available area F1 (the lower row as shown in FIG. 11) includes a plurality of second segments F12 (particularly referred to as second segments F124, F125, and F126) and a plurality of third segments F13 (particularly referred to as third segments F134, F135, and F136). In this step S17, the second segments F121, F122, and F123 in the upper row are respectively bonded with adhesive layers 200 to the third segments F131, F132, and F133 in the upper row, and the second segments F124, F125, and F126 in the lower row are respectively bonded with adhesive layers 200 to the third segments F134, F135, and F136 in the lower row Similarly, to step S17 in the above method aspect B), this step S17 of this method aspect C) may include positioning the second segments F12 with respect to the third segments F13 by matching markings of the second piece P2 with those of the third piece P3, or by matching outer shapes of the first, second, and third pieces P1, P2, P3.

Thereafter, a second cutting machine (not shown) is used to cut sections out of the bonded first, second, and third pieces P1, P2, P3 such that the sections form respective optical film laminates each including a bonded set of a first segment F11, a second segment F12, and a third segment F13 (step S18).

The or each optical film laminate thus obtained serves as the touch sensing device T2 as described above. More particularly, the first segment F11, the second segment F12, and the third segment F13 respectively serve as the first substrate 100a, the second substrate 100b, and the third substrate 100c. The first substrate 100a, the second substrate 100b, and the third substrate 100c have respective fast axes that are substantially parallel to each other. For example, the fast axes may extend within a range from 0° to 10°. Each first electrode group on the first face of the first substrate 100a serves as the first electrodes 110a, and each second electrode group on the first face of the third substrate 100c serves as the second electrodes 110b. If the touch sensing device T2 includes the cover panel 300, the manufacture of the touch sensing device T2 may preferably include, after obtaining the at least one optical film laminate (after step S18 in any of the above method aspects A) to C)), bonding the cover panel 300 with an adhesive layer 200 to the first face of the first substrate 100a of the optical film laminate.

It should be noted that the third manufacturing method may not include step S15. In this case, steps S17 and S18 may be performed in the following manner. In step S17 of the method aspect A), the second face of the at least one second segment F12 of the second piece P2 are bonded with an adhesive layer 200 to the first face of the at least one third segment F13 of the third piece P3, substantially maintaining the orientations of the at least one first segment F11 of the first piece P1 and the at least one second segment F12 of the second piece P2 as before the cutting, i.e. substantially maintaining the orientations of the first and second pieces P1, P2 as before the cutting. In step S18 of the method aspect A), a second cutting machine is used to cut sections out of the bonded structure of the first and second pieces P1, P2 and the material film F' such that the sections form respective optical film laminates each including a bonded set of a first segment F11, a second segment F12, and a third segment F13. In step S17 of the method aspect B) or C), the second faces of the second segments F12 of the second piece P2 are bonded with an adhesive layer 200 to the respective first faces of the third segments F13 of the third piece P3, substantially maintaining the orientations of the first segments F11 of the first piece P1 and the second segments F12 of the second piece P2 as before the cutting, i.e. substantially maintaining the orientations of the first and second pieces P1, P2 as before the cutting. In step S18 of the method aspect B) or C), a second cutting machine is used to cut sections out of the bonded structure of the first and second pieces P1, P2 and the material film F' such that the sections form respective optical film laminates each including a bonded set of a first segment F11, a second segment F12, and a third segment F13.

Moreover, if the available areas F1 includes a first available area F1 and a second available area F1, each first segment F11, each second segment F12, and each third segment F13 in the first available area F1 may be oriented at an angle to each first segment F11, each second segment F12, and each third segment F13 in the second available area F1, so that each first segment F11, each second segment F12, and each third segment F13 obtained from the first available area F1 have respective fast axes that are substantially parallel to the respective fast axes of each first segment F11, each second segment F12, and each third segment F13 obtained from the second available area F1 (see FIG. 6). Optical film laminates with such first, second, and third segments can be manufactured by aspects B) or C) of the third manufacturing method. The fast axes of the first, second, and third segments F11, F12, and F13 of an optical film laminate obtained from the first available area F1 are substantially parallel to the fast axes of the first, second, and third segments F11, F12, and F13 of an optical film laminate obtained from the second available area F1.

Figure 13:
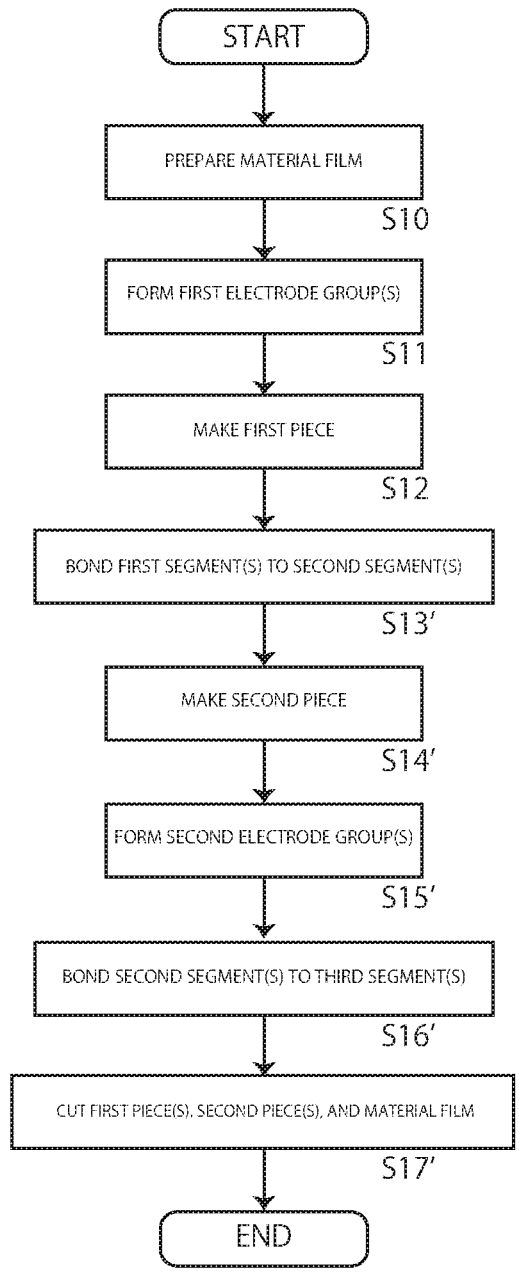
FIG. 13 is a flowchart of a fourth method for manufacturing the touch sensing device.

Next, a fourth method for manufacturing the touch sensing device T2 will be described with reference to FIG. 13. The fourth method is different from the third method in that steps S13 to S18 of the third method are replaced with steps S13' to S17' to be described. The difference will be described in detail below, particularly as method aspects A) to C), and the steps of the fourth method that are identical to those of the third method will not be repeated. The method aspects A) to C) of the fourth method respectively correspond to the method aspects A) to C) of the third method.

Method aspect A): After step S12 as described above, in a similar manner to step S5' of the method aspect A) of the second manufacturing method, the second face of the at least one first segment F11 of the first piece P1 is bonded with an adhesive layer 200 to the first face of the at least one second segment F12 in the material film F' (step S13'). If a transparent conductive film or a conductor as described above is already formed on the first face of the material film F' in step 10, step 13' may be preceded by removing the portion of the transparent conductive film or conductor on the first face of the or each second segment F12 by etching or other process.

Subsequently, the first cutting machine is used to cut a piece (hereinafter referred to as the second piece P2) out of the material film F' to make the second piece P2 including the at least one second segment F12 (making of the second piece P2, step S14').

Subsequently, a second electrode group is formed on the first face of the or each third segment F13 of the material film F', in a similar manner to step S14 of the method aspect A) of the third manufacturing method, (step S15'). This step S15' may be performed before step S12.

Subsequently, the second face of the at least one second segment F12 of the second piece P2 is bonded with an adhesive layer 200 to the first face of the at least one third segment F13 in the material film F', substantially maintaining the orientations of the at least one first segment F11 of the first piece P1 and the at least one second segment F12 of the second piece P2 as before the cutting, i.e. substantially maintaining the orientations of the first and second pieces P1 and P2 as before the cutting (step S16'). This step S16' may include positioning the at least one second segment F12 of the second piece P2 with respect to the at least one third segment F13 in the material film F' by matching markings of the second piece P2 with those of the material film F'.

If the first piece P1 includes a single first segment F11, the second piece P2 includes a single second segment F12, and the material film F' includes a single third segment F13, a second cutting machine (not shown) is used to cut a section out of bonded structure of the first and second pieces P1, P2, and the material film F' such that the section forms an optical film laminate including a bonded set of a first segment F11, a second segment F12, and a third segment F13 (step S17'). If the first piece P1 includes a plurality of first segments F11, the second piece P2 includes a plurality of second segments F12, and the material film F' includes a plurality of third segments F13, a second cutting machine is used to cut sections out of bonded structure of the first and second pieces P1, P2, and the material film F' such that the sections form respective optical film laminates each including a bonded set of a first segment F11, a second segment F12, and a third segment F13 (step S17').

Method aspect B): After step S12 as described above, the second faces of the first segments F11 in the available areas F1 of the first piece P1 are bonded with an adhesive layer 200 to the respective first faces of the second segments F12 in the available areas F1 of the material film F', in a similar manner to step S5' of the method aspect B) of the second manufacturing method (step S13'). The first segment F11 and the second segment F12 of each bonded set are positioned in the same one of the available areas F1. If a transparent conductive film or a conductor as described above is already formed on the first face of the material film F' in step 10, step 13' may be preceded by removing the portion of the transparent conductive film or conductor on the first faces of the second segments F12 by etching or other process.

Subsequently, the material film F' is forwarded to a first cutting machine to cut a piece (hereinafter referred to as the second piece P2) out of the material film F' to make the second piece P2 extending over the plurality of available areas F1 and accordingly including a plurality of second segments F12 (making of the second piece P2, step S14').

Subsequently, a second electrode group is formed on the first face of the third segment F13 in each available area F1 of the material film F', in a similar manner to step S14 of the method aspect B) of the third manufacturing method (S15'). This step S15' may be performed before step S12.

Subsequently, the second faces of the second segments F12 in the available areas F1 of the second piece P2 are bonded with an adhesive layer 200 to the respective first faces of the third segments F13 in the available areas F1 of the material film F', substantially maintaining the orientations of the first and second segments F11 in the available areas F1 of the first and second pieces P1, P2, i.e. substantially maintaining the orientations of the first and second pieces P1, P2 as before the cutting (step S16'). The second segment F12 and the third segment F13 of each bonded set positioned in the same one of the available areas F1. For example, if the available areas F1 includes two available areas F1, the second segment F12 and the third segment F13 in one of the two available areas F1 are bonded together with an adhesive layer 200, and the second segment F12 and the third segment F13 in the other available area F1 are bonded together with an adhesive layer 200 Similarly, to step S16' of the method aspect A) of the fourth manufacturing method, this step S16' may include positioning the second segments F12 with respect to the third segments F13 by matching markings on the second piece P2 with those on the material film F'.

Subsequently, a second cutting machine (not shown) is used to cut sections out of bonded structure of the first and second pieces P1, P2 and the material film F' such that the sections form respective optical film laminates each including a bonded set of a first segment F11, a second segment F12, and a third segment F13 (step S17').

C) After step S12 described above, in a similar manner to step S5' of the method aspect C) of the second manufacturing method, the second faces of the first segments F11 of the first piece P1 are bonded with an adhesive layer 200 to the respective first faces of the second segments F12 of the material film F' (step S13'). The first segments F11 in each row (i.e. in each available area F1) are bonded to the second segments F12 in the same one of the rows, (i.e. in the same one of the available areas F1). In step S10, if a transparent conductive film or a conductor as described above is previously formed on the first face of the material film F', step S13' may be preceded by removing the portion of the transparent conductive film or conductor on the first face of each second segment F12 by etching or other process.

Subsequently, the first cutting machine is used to cut a piece (hereinafter referred to as the second piece P2) out of the material film F' to make the second piece P2 extending a plurality of available areas F1 and accordingly including the plurality of second segments F12 (making of the second piece P2, step S14'). More particularly, the second piece P2 includes a plurality of rows corresponding to the respective available areas F1, and each row has a plurality of second segments F12 aligned in the MD.

Subsequently, in a similar manner to in step S14 of the method aspect C) of the third manufacturing method, a second electrode group is formed on the first face of each third segment F13 in each available area F1 of the material film F' (step S15'). Step S15' can be performed before step S12.

Subsequently, the second faces of the second segments F12 in the rows in the second piece P2 are bonded with an adhesive layer 200 to the respective first faces of the third segments F13 in the rows in the material film F', substantially maintaining the orientations of the first and second segments F11, F12 in f the rows of the first and second pieces P1, P2 as before the cutting, i.e. substantially maintaining the orientations of the first and second pieces P1, P2 as before the cutting (step S16'). The second segments F12 in each row (i.e. in each available area F1) are bonded to the third segments F13 in the same one of the rows, (i.e. in the same one of the available areas F1). For example, if the available areas F1 includes two available areas F1, the second segments F12 in one of the two available area F1 are bonded with an adhesive layer 200 to the respective third segments F13 in the same available area F1, and the second segments F12 in the other available area F1 are bonded with an adhesive layer 200 to the respective third segments F13 in the same available area F1 Similarly, to in step S16' of the method aspect A) of the fourth manufacturing method, step S16' of this method aspect C) may include positioning the second segments F12 with respect to the third segments F13 by matching of markings of the second piece P2 with those of the material film F'.

Subsequently, a second cutting machine (not shown) is used to cut sections out of bonded structure of the first and second pieces P1, P2 and the material film F' such that the sections form respective optical film laminates each including a bonded set of a first segment F11, a second segment F12, and a third segment F13 (step S17').

The or each optical film laminate thus obtained also serves as the touch sensing device T2 as described above. More particularly, each first segment F11, each second segment F12, and each third segment F13 respectively serve as the first substrate 100a, the second substrate 100b, and the third substrate 100c. The first substrate 100a, the second substrate 100b, and the third substrate 100c have respective fast axes that are substantially parallel to each other (e.g. the fast axes may extend within a range from 0° to 10°). The first electrode group on the first face of the first substrate 100a serves as the first electrodes 110a, and the second electrode group on the first face of the third substrate 100c serves as the second electrodes 110b. If the touch sensing device T2 includes the cover panel 300, the manufacture of the touch sensing device T2 may preferably include, after obtaining the at least one optical film laminate (after step S17' in any of the above method aspects A) to C)), bonding the cover panel 300 with an adhesive layer 200 to the first face of the first substrate 100a of the optical film laminate.

Moreover, in the material film F used in the fourth manufacturing method, if the available areas F1 of the material film F' includes include a first available area F1 and a second available area F1, similarly to the third method, the or each first segment F11, the or each second segment F12, and the or each third segment F13 in the first available area F1 may be oriented at an angle to those in the second available area F1, so that the or each first segment F11, the or each second segment F12, and the or each third segment F13 obtained from the first available area F1 have fast axes that are substantially parallel to the fast axes of the or each first segment F11, the or each second segment F12, and the or each third segment F13 obtained from the second available area F1 (see FIG. 6).

The touch sensing device T2, the third manufacturing method, and the fourth manufacturing method which have been described above produce the following technical features and effects. Firstly, the two bonded substrates 100 of a touch sensing device T2 have fast axes that extend substantially in the same direction, i.e. the misalignment of the fast axes is minimized. The inventors learned that in a biaxially-stretched material film F' having an available area F1 that is an area in the widthwise direction of the material film F', if first segments F11, second segments F12, and third segments F13 are taken from anywhere in the lengthwise direction in the available area F1 (for example, whether taken from a portion at a distance of 1 meter or 100 mm from a lengthwise end of the material film F'), the first, second, and third segments F11, F12, F13 have fast axes that extend substantially in the same direction (within a range of about 3°). Accordingly, by bonding a first segment F11, a second segment F12, and a third segment F13 in the same available area F1 to use them as three substrates 100 of a touch sensing device, the misalignment of the fast axes between the three substrates 100 is minimized. It should be appreciated that in the context of the invention, it is sufficient if variation in fast axis between a first segment F11, a second segment F12, and a third segment F13 in an available area F1 falls within a range of 10°.

Secondly, the touch sensing device T2 is suitable for mass production for the following reasons. As described above, the first segment F11, the second segment F12, and the third segment F13 of the touch sensing device T2 are simply taken from different areas in the lengthwise direction of the same available area F1 and bonded together, there is no need to measure or otherwise determine the orientations of the fast axes of the first segment F11, the second segment F12, and the third segment F13. If the material film F' includes a plurality of available areas F1 and each available area F1 includes at least one first segment F11, at least one second segment F12, and at least one third segment F13, or if an available area F1 of the material film F' includes a plurality of first segments F11, a plurality of second segments F12, and a plurality of third segments F13, it is possible to obtain a plurality of optical film laminates each including a first segment F11, a second segment F12, and a third segment F13, by bonding a plurality of first segments F11 to the corresponding second segments F12 by batch and bonding the second segments F12 to the corresponding third segments F13 by batch. Such optical film laminates are suitable for mass production of the touch sensing devices T2.

Thirdly, if the available areas F1 include the first available area F1 and the second available area F1, respective fast axes of the first segment F11, the second segment F12, and the third segment F13 of an optical film laminate which is obtained from the first available area F1 can be made substantially parallel to respective fast axes of the first segment F11, the second segment F12, and the third segment F13 of an optical film laminate which is obtained from the second available area F1. The reasons are as follows. The first segment F11, the second segment F12, and the third segment F13 in the first available area F1 are inclined with respect to the first segment F11, the second segment F12, and the third segment F13 in the second available area F1, respectively, so that respective fast axes of the first segment F11, the second segment F12, and the third segment F13 of an optical film laminate which is obtained from the first available area F1 are substantially parallel to respective fast axes of the first segment F11, the second segment F12, and the third segment F13 of an optical film laminate which is obtained from the second available area F1.

Fourthly, in a case of the above-described fourth manufacturing method, there is no need to make the third piece P3, so that a number of processes can be reduced.

It is additionally noted that the above-described manufacturing methods for a touch sensing device and the above-described touch sensing devices are not limited to the above-described embodiments, and can be modified in design in any manner within a scope as recited by claims for patent.

The plurality of second electrodes 110b of the touch sensing device T1 can be provided not on the first face of the second substrate 100b, but on the second face (opposite to the first face) of the first substrate 100a. In this case, in the first or second method for manufacturing a touch sensing device according to the invention, a second electrode group which is to serve as a plurality of second electrodes should be formed on not the first face of the second segment F12, but the second face opposite to the first face, of the first segment F11, before the above-described step S3. At that time, the same forming process as the forming process in the above-described step S4 can be used.

Respective outer shapes of the first segment and the second segment of the material film (that is, respective outer shapes of the first substrate and the second substrate) according to the invention may be different from each other.

Respective outer shapes of the first segment, the second segment, and the third segment of the material film (that is, respective outer shapes of the first substrate, the second substrate, and the third substrate) according to the invention may be different from each other.

A process of forming a first electrode group and/or a second electrode group can be omitted from any of the aspects of the above-described manufacturing methods according to the invention. If a process of forming a first electrode group or a second electrode group is omitted, either at least one optical laminate in which the first segment and the second segment are bonded by an adhesive layer and an electrode group is formed in one of the first segment and the second segment, or at least one optical laminate in which the first segment, the second segment, and the third segment are bonded by an adhesive layer and an electrode group is formed in one of the first segment and the third segment, is obtained by any of the aspects of the above-described manufacturing methods. If a process of forming a first electrode group and a second electrode group is omitted, either at least one optical laminate in which the first segment and the second segment do not include an electrode group and are bonded by an adhesive layer, or at least one optical laminate in which the first segment, the second segment, and the third segment do not include an electrode group and are bonded by an adhesive layer, is obtained by any of the aspects of the above-described manufacturing methods. By bonding the foregoing optical laminate including no electrode group to the foregoing optical laminate including at least one electrode group, it is possible to obtain a touch sensing device. It is additionally noted that there is no need to perform a treatment which should be performed on an electrode base layer, on a substrate in which no electrode group is formed. Thus, a first electrode or a second electrode can be omitted from the touch sensing device according to the invention.

The materials, the shapes, the dimensions, the numbers, the positions, etc. in the steps of the manufacturing methods for a touch sensing device in the above-described embodiments and their variants are presented by way of example only and can be modified in any manner so far as the same functions can be fulfilled. The materials, the shapes, the dimensions, the number, the positions, etc. of the elements of the touch sensing devices in the above-described embodiments and their variants are presented by way of example only and can be modified in any manner so far as the same functions can be fulfilled. The aspects and variants of the above-described embodiments can be combined in any possible manner.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

REFERENCE SIGNS LIST

T1, T2: touch sensing device
100: substrate
100a: first substrate
100b: second substrate
100c: third substrate
110a: first electrode
110b: second electrode
200: adhesive layer
300: cover panel
D: image display device
G: polarizing plate
F, F': material film
F1: available area
F11: first segment
F12: second segment
F13: third segment
P1: first piece
P2: second piece
P3: third piece

What is claimed is:

1. A method for manufacturing a touch sensing device, the method comprising:
preparing a material film, the material film being biaxially stretched and including an available area that is a partial area in a widthwise direction of the material film, the available area extending in a lengthwise direction of the material film and including a first segment and a second segment, the first and second segments defining different areas in the lengthwise direction and each including a first face and a second face opposite each other in a thickness direction of the material film;
forming an electrode group on one of the first segment and the second segment;
cutting a first piece out of the material film to make the first piece including the first segment;
cutting a second piece out of the material film to make the second piece including the second segment; and
bonding the second face of the first segment of the first piece to the first face of the second segment of the second piece, substantially maintaining orientations of the first segment and the second segment as before the cutting.

2. The method according to claim 1, wherein
the available area of the material film comprises a plurality of available areas, the available areas being different areas in the widthwise direction of the material film and each having the first segment and the second segment,
the formation of the electrode group includes forming the electrode group on one of the first segment and the second segment in each of the available areas,
the making of the first piece includes cutting the first piece out of the material film to make the first piece extending over the plurality of available areas and including a plurality of the first segments,
the making of the second piece includes cutting the second piece out of the material film to make the second piece extending over the plurality of available areas and including a plurality of the second segments, the bonding of the first segment to the second segment includes bonding second faces of the first segments respectively to first faces of the second segments, substantially maintaining orientations of the first segments in the plurality of available areas and the second segments in the plurality of available areas as before the cutting, wherein the first segment and the second segment of each bonded set are positioned in the same one of the available areas, and the method further comprises cutting sections out of the bonded first and second pieces such that the sections form respective optical film laminates each including one bonded set of the first segment and the second segment.

3. The method according to claim 1, wherein the first segment of the available area includes a plurality of the first segments aligned in a row in the lengthwise direction, the second segment of the available area includes a plurality of the second segments aligned in a row in the lengthwise direction, the formation of the electrode group includes forming the electrode group on each of the first segments or on each of the second segments, the making of the first piece includes cutting the first piece out of the material film to make the first piece including the first segments, the making of the second piece includes cutting the second piece out of the material film to make the second piece including the second segments, the bonding of the first piece to the second piece includes bonding second faces of the first segments of the first piece respectively to first faces of the second segments of the second piece, substantially maintaining orientations of the first segments and the second segments as before the cutting, and the method further comprises cutting sections out of the bonded first and second pieces such that the sections form respective optical film laminates each including one bonded set of the first segment and the second segment.

4. The method according to claim 3, wherein the available area of the material film comprises a plurality of available areas, the available areas being different areas in the widthwise direction of the material film and each having a plurality of the first segments and a plurality of the second segments, the formation of the electrode group includes forming the electrode group on each of the first segments in each of the available areas or on each of the second segments in each of the available areas, the making of the first piece includes cutting the first piece out of the material film to make the first piece extending over the plurality of available areas and including a plurality of the first segments arranged in the plurality of available areas, the making of the second piece includes cutting the second piece out of the material film to make the second piece extending over the plurality of available areas and including a plurality of the second segments arranged in the plurality of available areas, the bonding of the first piece to the second piece includes bonding second faces of the first segments of the first piece respectively to first faces of the second segments of the second piece, substantially maintaining orientations of the first segments and the second segments as before the cutting, wherein the first segment and the second segment of each bonded set are positioned in the same one of the available areas, and the formation of the optical film laminates includes cutting sections out of the bonded first and second pieces such that the sections form the optical film laminates each including one bonded set of the first segment and the second segment.

5. The method according to claim 1, wherein the available area of the material film further includes a third segment being a different area in the lengthwise direction from the first and second segments, the third segment including a first face and a second face opposite each other in the thickness direction, the formation of the electrode group includes forming the electrode group on the first segment of the available area, and the method further comprises:

forming an electrode group on the third segment;

cutting a third piece out of the material film to make the third piece including the third segment; and after the bonding of the first segment to the second segment, bonding the second face of the second segment of the second piece to the first face of the third segment of the third piece, substantially maintaining orientations of the first segment, the second segment, and third segment as before the cutting.

6. The method according to claim 1, wherein the available area of the material film further includes a third segment being a different area in the lengthwise direction from the first and second segments, the third segment including a first face and a second face opposite each other in the thickness direction, the formation of the electrode group includes forming the electrode group on the first segment of the available area, and the method further comprises:

forming an electrode group on the third segment; and after the bonding of the first segment to the second segment, bonding the second face of the second segment of the second piece to the first face of the third segment in the material film, substantially maintaining orientations of the first segment and the second segment as before the cutting.

7. The method according to claim 1, wherein the formation of the electrode group includes forming an electrode group on the first segment and forming another electrode group on the second segment.

8. A method for manufacturing a touch sensing device, the method comprising:

preparing a material film, the material film being biaxially stretched and including an available area that is a partial area in a widthwise direction of the material film, the available area extending in a lengthwise direction of the material film and including a first segment and a second segment, the first and second segments defining different areas in the lengthwise direction and each including a first face and a second face opposite each other in a thickness direction of the material film;

forming an electrode group on one of the first segment and the second segment;

cutting a first piece out of the material film to make the first piece including the first segment;

subsequently bonding the second face of the first segment of the first piece to the first face of the second segment in the material film to make a bonded structure of the first piece and the material film, substantially maintaining an orientation of the first segment as before the cutting; and cutting a section out of the bonded structure such that the section forms an optical film laminate including a bonded set of the first segment and the second segment.

9. The method according to claim 8, wherein the available area of the material film comprises a plurality of available areas, the available areas being different areas in the widthwise direction of the material film and each having the first segment and the second segment, the formation of the electrode group includes forming the electrode group on one of the first segment and the second segment in each of the available areas, the making of the first piece includes cutting the first piece out of the material film to make the first piece extending over the plurality of available areas and including a plurality of the first segments, the bonding of the first segment to the material film includes bonding second faces of the first segments of the first piece respectively to first faces of the second segments in the material film to make the bonded structure of the first piece and the material film, substantially maintaining orientations of the first segments in the plurality of available areas as before the cutting, wherein the first segment and the second segment of each bonded set are positioned in the same one of the available areas, and the formation of the optical film laminate includes cutting a plurality of sections out of the bonded structure such that the sections form respective optical film laminates each including one bonded set of the first segment and the second segment.

10. The method according to claim 8, wherein the first segment of the available area includes a plurality of the first segments aligned in a row in the lengthwise direction, the second segment of the available area includes a plurality of the second segments aligned in a row in the lengthwise direction, the formation of the electrode group includes forming the electrode group on each of the first segments or one each of the second segments, the making of the first piece includes cutting the first piece out of the material film to make the first piece including a plurality of the first segments, the bonding of the first segment to the material film includes bonding second faces of the first segments of the first piece respectively to first faces of the second segments in the material film to make the bonded structure of the first piece and the material film, substantially maintaining orientations of the first segments as before the cutting, and the formation of the optical film laminate includes cutting a plurality of sections out of the bonded structure such that the sections form respective optical film laminates each including one bonded set of the first segment and the second segment.

11. The method according to claim 10, wherein the available area of the material film comprises a plurality of available areas, the available areas being different areas in the widthwise direction of the material film and each having a plurality of the first segments and a plurality of the second segments, the formation of the electrode group includes forming the electrode group on each of the first segments in each of the available areas or on each of the second segments in each of the available areas, the making of the first piece includes cutting the first piece out of the material film to make the first piece extending over the plurality of available areas and including the plurality of first segments arranged in the plurality of available areas, the bonding of the first segments to the material film includes bonding second faces of the first segments of the first piece respectively to first faces of the second segments in the material film to make the bonded structure of the first piece and the material film, substantially maintaining orientations of the first segments in the plurality of available areas of the first piece as before the cutting, wherein the first segment and the second segment of each bonded set are positioned in the same one of the available areas, and the formation of the optical film laminates includes cutting a plurality of sections out of the bonded structure such that the sections form respective optical film laminates each including one bonded set of the first segment and the second segment.

12. The method according to claim 8, wherein the available area of the material film further includes a third segment being a different area in the lengthwise direction from the first and second segments, the third segment including a first face and a second face opposite each other in the thickness direction, the formation of the electrode group includes forming the electrode group on the first segment of the available area, and the method further comprises:

forming an electrode group on the third segment;

after the bonding of the first segment to the second segment, cutting a second piece out of the material film to make the second piece including the second segment; and bonding the second face of the second segment of the second piece to the first face of the third segment in the material film, substantially maintaining orientations of the first segment and the second segment as before the cutting.

13. The method according to claim 8, wherein the formation of the electrode group includes forming an electrode group on the first segment and forming another electrode group on the second segment.

14. A touch sensing device comprising:

a first substrate being formed of a first segment of an available area of a material film and having a fast axis, the material film being biaxially stretched, the available area of the material film defining an area in a widthwise direction of the material film and extending in a lengthwise direction of the material film, a second substrate being formed of a second segment of the available area and having a fast axis, the first and second segments defining different areas in the lengthwise direction of the available area;

a plurality of first electrodes formed on one of the first substrate and the second substrate; and an adhesive layer bonding the first substrate and the second substrate such that the fast axes of the first and second substrates are substantially parallel to each other.

15. The touch sensing device according to claim 14, further comprising a plurality of second electrodes formed on the other of the first substrate and the second substrate, wherein the first electrodes cross the second electrodes.

16. A touch sensing device comprising:
- a first substrate being formed of a first segment of an available area of a material film and having a fast axis, the material film being biaxially stretched, the available area of the material film defining an area in a widthwise direction of the material film and extending in a lengthwise direction of the material film,
- a second substrate formed of a second segment of the available area;
- a third substrate formed of a third segment of the available area, wherein the first, second, and third segments are different areas in the lengthwise direction of the available area;
- a plurality of first electrodes formed on the first substrate;
- a plurality of second electrodes being formed on the third substrate and crossing the first electrodes;
- a first adhesive layer bonding the first substrate and the second substrate such that respective fast axes of the first and second substrates are substantially parallel to each other; and
- a second adhesive layer bonding the second substrate and the third substrate such that the fast axes of the second and third substrates are substantially parallel to each other.

\* \* \* \* \*